(12) United States Patent
Taira et al.

(10) Patent No.: US 6,886,990 B2
(45) Date of Patent: May 3, 2005

(54) OPTICAL CONNECTOR

(75) Inventors: Junji Taira, Chiba (JP); Kouji Minami, Chiba (JP); Ryo Nagase, Tokyo (JP); Syuichi Yanagi, Tokyo (JP); Shuichiro Inagaki, Tokyo (JP); Taisei Miyake, Tokyo (JP); Yuji Shinagawa, Tokyo (JP); Masaji Suwabe, Tokyo (JP); Hidekazu Onouchi, Tokyo (JP)

(73) Assignees: Seiko Instruments Inc., Nippon, Tokyo (JP); Telegraph and Telephone Corporation, Tokyo (JP); Sanwa Denki Kogyo Co., Ltd., Tokyo (JP)

( * ) Notice: Subject to any disclaimer, the term of this patent is extended or adjusted under 35 U.S.C. 154(b) by 0 days.

(21) Appl. No.: 10/434,333

(22) Filed: May 8, 2003

(65) Prior Publication Data
US 2003/0215191 A1 Nov. 20, 2003

(30) Foreign Application Priority Data
May 9, 2002 (JP) ........................................ 2002-133795

(51) Int. Cl.[7] .............................................. G02B 6/36
(52) U.S. Cl. ............................. 385/78; 385/72; 385/75; 385/84
(58) Field of Search ........................ 385/55, 58, 66–68, 385/70, 72, 75, 77, 78

(56) References Cited

U.S. PATENT DOCUMENTS 6,419,401 B1 * 7/2002 Taira et al. .................... 385/60

FOREIGN PATENT DOCUMENTS

JP         08106028 A  *  4/1996  ............ G02B/6/36

* cited by examiner

Primary Examiner—Juliana K. Kang
(74) Attorney, Agent, or Firm—Adams & Wilks

(57) ABSTRACT

An optical connector has a ferrule comprises of a cylindrical body for supporting an optical fiber, and a flange member having an end portion connected to a first end of the cylindrical body and a flange part projecting from the end portion. A holding member supports the ferrule and has an engaging part. A rotation positioning part is formed in the flange part of the flange member for positioning the flange part relative to the holding member to provide a first clearance between the rotation positioning part and the engaging part of the holding member for restricting rotation of the ferrule about the fiber optical axis relative to the holding member. A rotation allowing part is formed in the flange part of the flange member and spaced from the engaging part of the holding member to provide a second clearance therebetween greater than the first clearance for allowing rotational movement of the ferrule so as to permit the ferrule to incline in a direction transverse to an axis of the optical connector.

30 Claims, 16 Drawing Sheets

OPTICAL CONNECTOR

BACKGROUND OF THE INVENTION

1. Field of the Invention

The present invention relates to an optical connector, such as an Angle-Pc connector, for connecting the slanted, polished surfaces of optical fibers together.

2. Description of the Related Art

As an optical connector, for use in optical communications or the like, a conventional Angle-Pc (Physical Contact) connector is used for the purpose of reducing connection loss and reflection return light at the connection of connectors, which has an optical fiber held in the ferrule and polished, at its end face together with an end face of the ferrule end face, oblique relative to a plane vertical to the axis of the optical fiber and into a convex spherical surface.

Herein, the ferrule to be used in the conventional Angle-PC connector is explained.

FIGS. 16A–16C perspective and plan views of a ferrule according to the related art.

As shown in FIGS. 16A–16C, a ferrule 160 used in an Angle-PC connector comprises a ferrule cylindrical body 140 having a tip face having a circular cylinder form provided as a convex surface form slanted relative to a plane orthogonal to the axis, and a flange member 150 fit in a rear end of the ferrule cylindrical body 140. The flange member 150 has a flange part 153 radially projecting and circumferentially extending on the outer periphery thereof close to the ferrule cylinder 140. The flange part 153 is provided with a key groove 154 which, when held in a not-shown plug frame of the Angle-PC connector, is to be engaged with the engaging projection axially provided in the same engaging width in the plug frame. The key grooves 154 are axially provided equal in width, in four locations at an interval of 90 degrees with respect to a circumferential direction of the flange part.

Such ferrules, held in plug frames, are to be optically connected at a low insertion loss and high return loss through an optical connector adapter or the like, by making an opposed connection with the end surfaces of the ferrules 160 placed in abutment against each other.

However, in the Angle-PC connector, there is a problem that, in case the ferrule has a great movement in rotational direction about the axis, the convex spherical surface is increased in eccentric center of curvature, thus making impossible to realize a low insertion loss and high return loss.

In this manner, in order to realize a low insertion loss and high return loss, there is a need to provide an eccentric center of curvature of 50 μm or less to the spherical surface provided at the tip surface of the ferrule cylindrical body. This requires to suppress the rotation angle of the ferrule in rotational direction about axis to ±2 degrees or less, preferably ±3 degrees or less.

For this reason, by providing 0.01–0.1 mm to a clearance between the flange-part key groove of the flange member and the engaging projection provided in the plug frame, the rotation chatter of the ferrule about the axis can be suppressed low to provide an eccentric center of curvature of 50 μm or less thereby providing a low insertion loss and high return loss.

However, conventionally, in case to provide a clearance 0.01–0.1 mm to between the key groove of the flange member and the engaging projection in order to suppress the rotation chatter of the ferrule about the axis, the optical connector plug when attached/detached to/from the optical connector adapter is restricted in the radial movement of the ferrule, resulting a problem of poor attaching/detaching stability.

Meanwhile, as compared to the optical connector plug using a ferrule cylindrical body having an outer diameter of 2.5 mm, the optical connector plug in which the ferrule cylindrical body uses a 1.25-mm ferrule cylindrical body has a necessity to reduce generally to a half the clearance between the flange-part key groove and the engaging projection in suppressing low the eccentric center of curvature. This, however, involves a problem that accurate working is required, thus making not feasible substantially.

SUMMARY OF THE INVENTION

It is an aspect of the present invention to provide an Angle-PC connector which can be stably attached/detached by eliminating stress during attachment/detachment.

A first form of the preset invention, for solving the foregoing problem, is in an Angle-PC connector having a ferrule made with a ferrule cylindrical body holding an optical fiber and having a tip face formed in a convex surface form slanting relative to a plane orthogonal to an optical fiber axis and a flange member to be fit to a rear end of the ferrule cylindrical body, and a holding member for restricting the ferrule from moving in an rotational direction about the optical fiber axis and urgingly holding the ferrule toward the axis, an Angle-PC connector comprising: a flange part provided in a polygonal or disk form circumferentially projecting on the flange member at a tip side thereof; an engaging part formed axially of the optical fiber and in a predetermined engaging width, in the holding member; the flange part having a predetermined clearance to the engaging part at an axial tip side thereof; a rotation positioning part restricting a movement in rotational direction of the flange part, and a rotation allowing part for forming, on a rear-end side of the rotation positioning part, a clearance greater than the clearance of between the rotation positioning part and the engaging part.

A second form of the invention is an Angle-PC connector according to the first form, wherein the ferrule has an rotation angle in rotational direction about the axis of ±3 degrees or less with respect to the holding member that is to be allowed by the predetermined clearance between the rotation positioning part and the engaging part.

A third form of the invention is an Angle-PC connector according to the second form, wherein the ferrule has an rotation angle in rotational direction about the axis of ±2 degrees or less with respect to the holding member that is to be allowed by the predetermined clearance between the rotation positioning part and the engaging part.

A fourth form of the invention is an Angle-PC connector according to any of the first to third forms, wherein the ferrule has an inclination angle from the axis of ±5 degrees or greater with respect to the rotation positioning part as a start point.

A fifth form of the invention is an Angle-PC connector according to any of the first to fourth forms, wherein the rotation positioning part and rotation allowing part of the flange part is formed by key grooves axially provided in the flange part, the engaging part being engaging projections projecting in the key grooves.

A sixth form of the invention is an Angle-PC connector according to the fifth form, wherein the ferrule cylindrical body has an outer diameter of substantially 2.5 mm.

A seventh form of the invention is an Angle-PC connector according to the fifth or sixth form, wherein the key grooves constituting the rotation positioning part have an axial length of 0.3–0.5 mm.

An eighth form of the invention is an Angle-PC connector according to any of the fifth to seventh forms, wherein the holding member is to engage an SC-type connector adapter.

A ninth form of the invention is an Angle-PC connector according to any of the first to fourth forms, wherein the rotation positioning part and rotation allowing part of the flange part is structured by an outer peripheral surface of the flange part, the engaging part being an engaging hole.

A tenth form of the invention is an Angle-PC connector according to the ninth form, wherein the rotation allowing part is formed in a manner inclining toward the axis.

An eleventh form of the invention is an Angle-PC connector according to the tenth form, wherein the taper surface structuring the rotation allowing part is formed at an angle of 5 degrees with respect to the axis.

A twelve form of the invention is an Angle-PC connector according to the tenth form, wherein the rotation positioning part is structured with an outer peripheral surface in a disk form.

A thirteenth form of the invention is an Angle-PC connector according to any of the ninth to twelve forms, where in the ferrule cylindrical body has an outer diameter of substantially 1.25 mm.

A fourteenth form of the invention is an Angle-PC connector according to the thirteenth form, wherein the flange part constituting the rotation positioning part has an outer peripheral surface having an axial length of 0.4–0.6 mm.

A fifteenth form of the invention is an Angle-PC connector according to any of the ninth to fourteenth forms, wherein the holding member is to engage an MU-type or LC-type optical connector adapter.

The present invention thus configured, because the holding member of the ferrule is allowed in its rotation angle of rotational direction within a predetermined range by the rotation positioning part and to be inclined toward the radial direction within a predetermined range, can easily realize a low insertion loss and high return loss during optical connection and further can be relieved of the stress in a direction different from that in the axial direction during attachment/detachment to/from an optical connector adapter.

BRIEF DESCRIPTION OF THE DRAWINGS

FIGS. 15A–5C are a perspective view, plan view and sectional view, respectively, showing another example of rotation allowing part according to embodiment 2 of the invention.

DETAILED DESCRIPTION OF THE PREFERRED EMBODIMENTS

The present invention will now be explained in detail on the basis of the embodiments.

Embodiment 1

Figure 1:
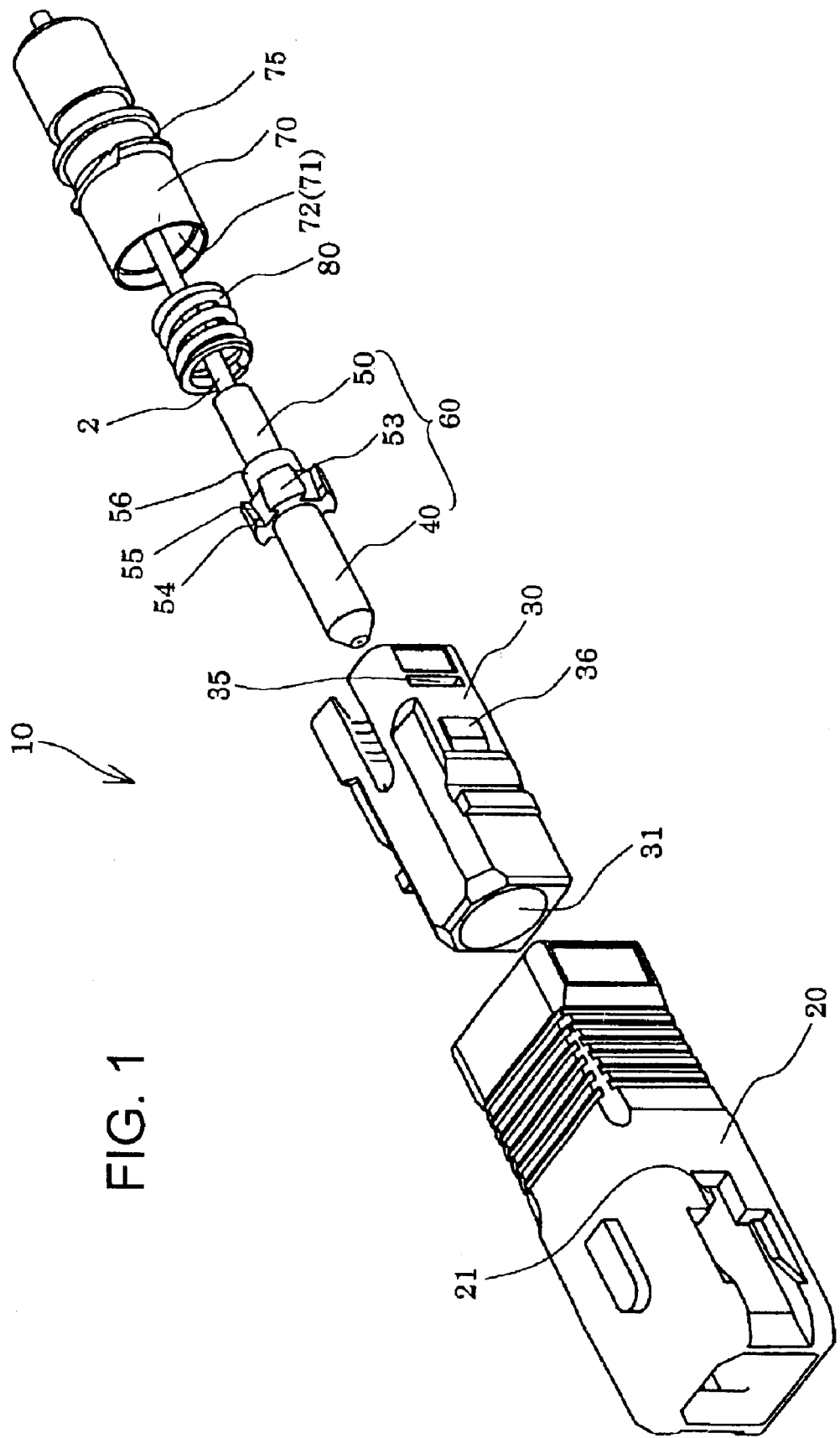
FIG. 1 is an exploded perspective view of an Angle-PC connector according to embodiment 1 of the present invention.
Figure 2A:
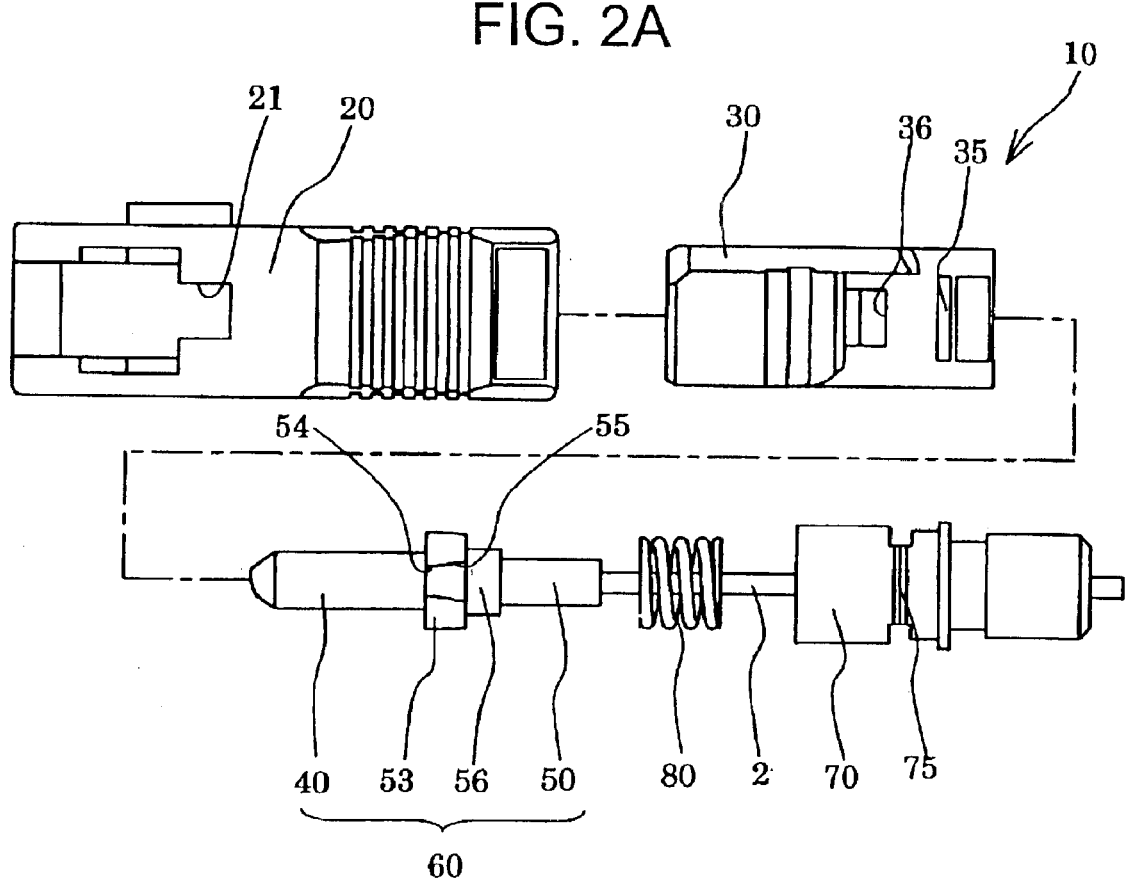
FIGS. 2A and 2B are an exploded plan view and assembly sectional view of the Angle-PC connector according to embodiment 1 of the invention.
Figure 2B:
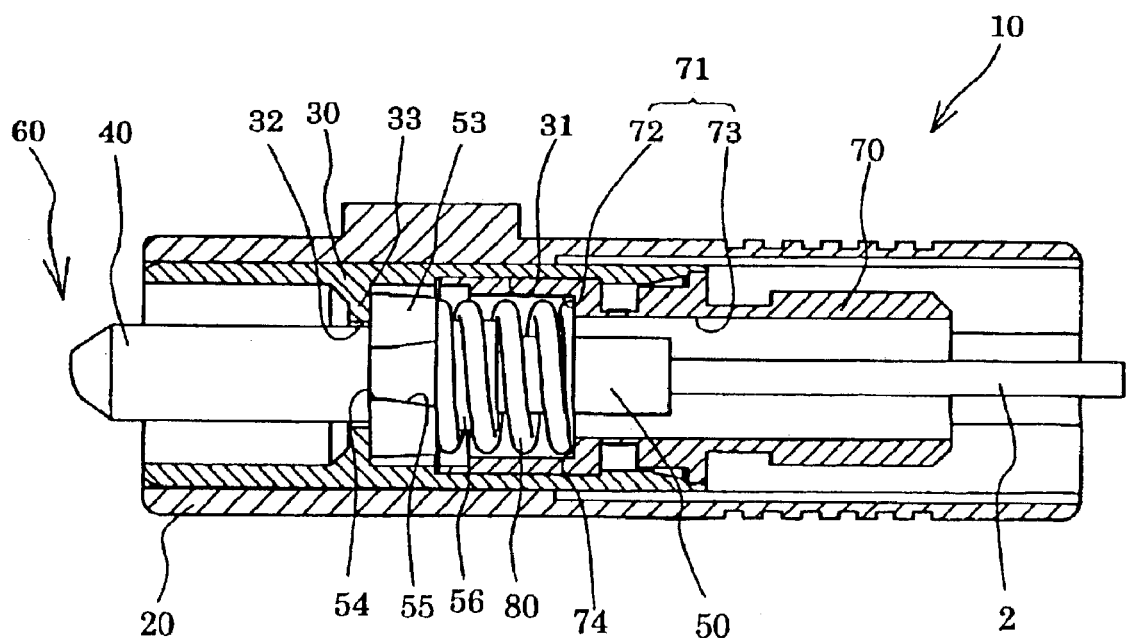
Figure 3A:
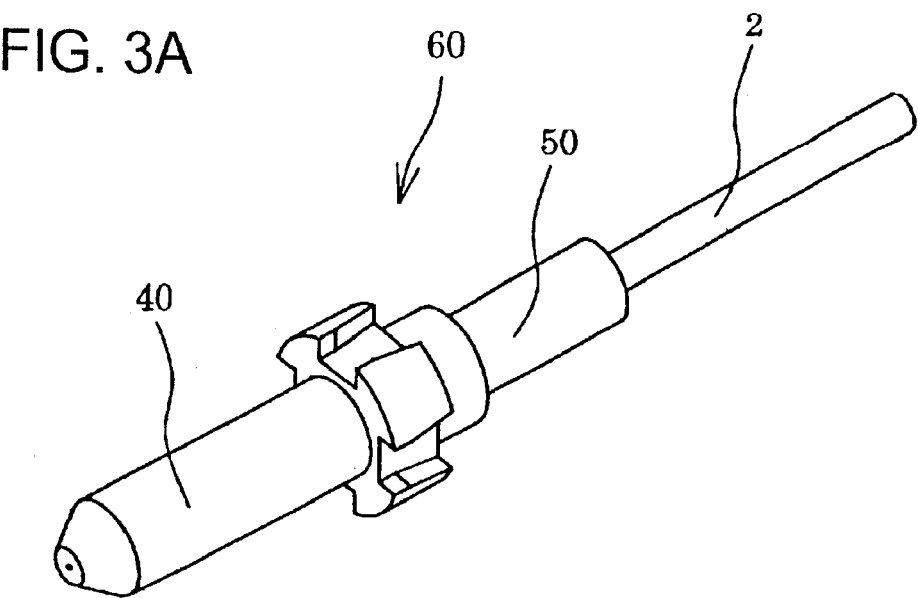
FIGS. 3A–3C are a perspective view, plan view and sectional view, respectively, of the ferrule according to embodiment 1 of the invention.
Figure 3B:
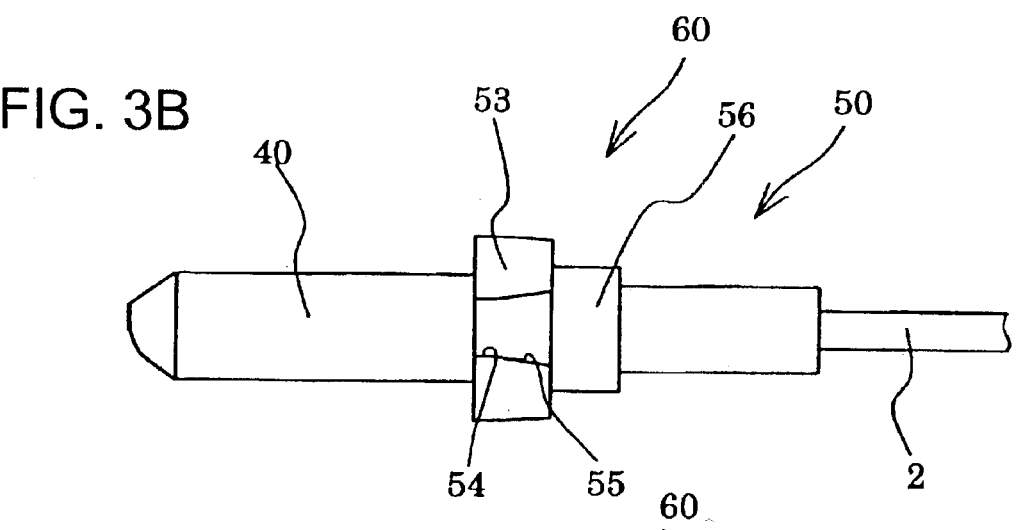
Figure 3C:
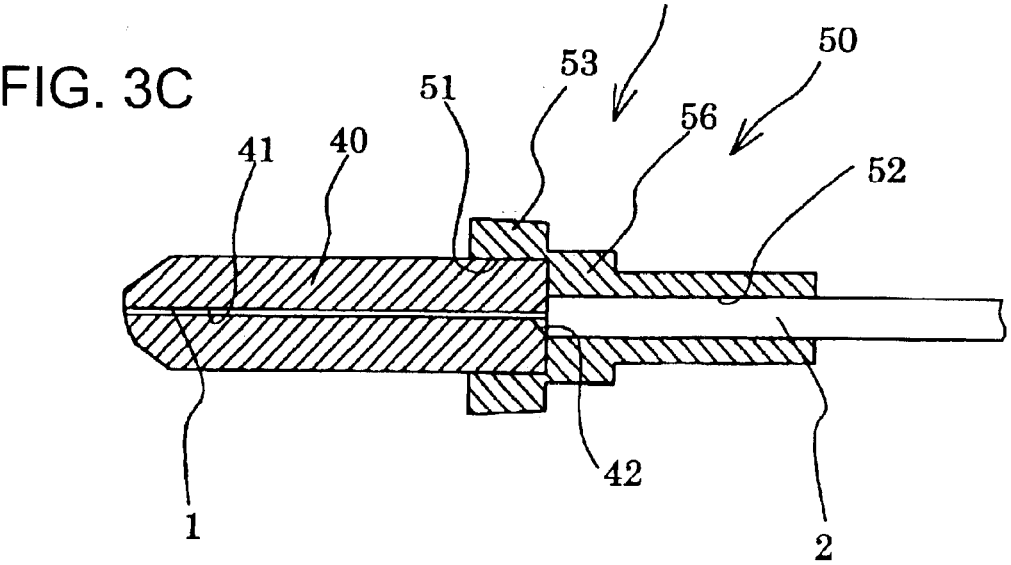
Figure 4A:
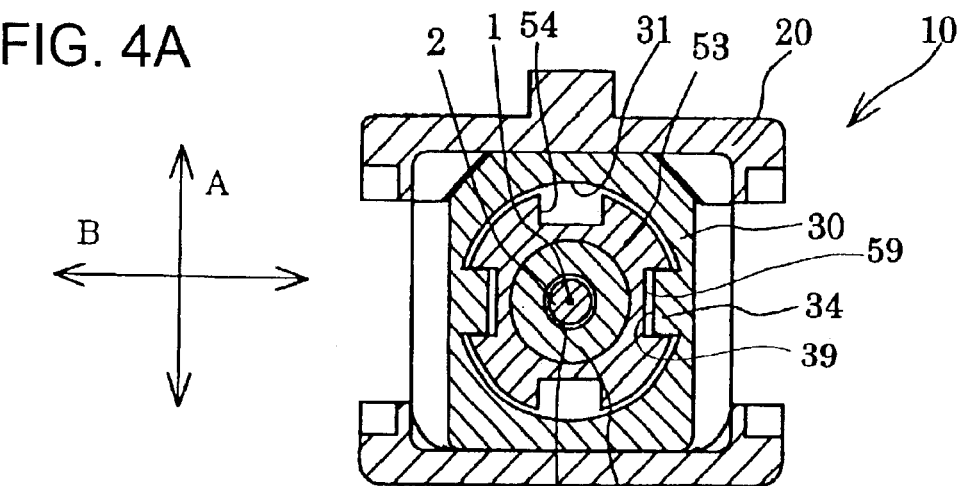
FIGS. 4A–4C are cross-sectional views of the Angle-PC connector according to embodiment 1 of the invention.
Figure 4B:
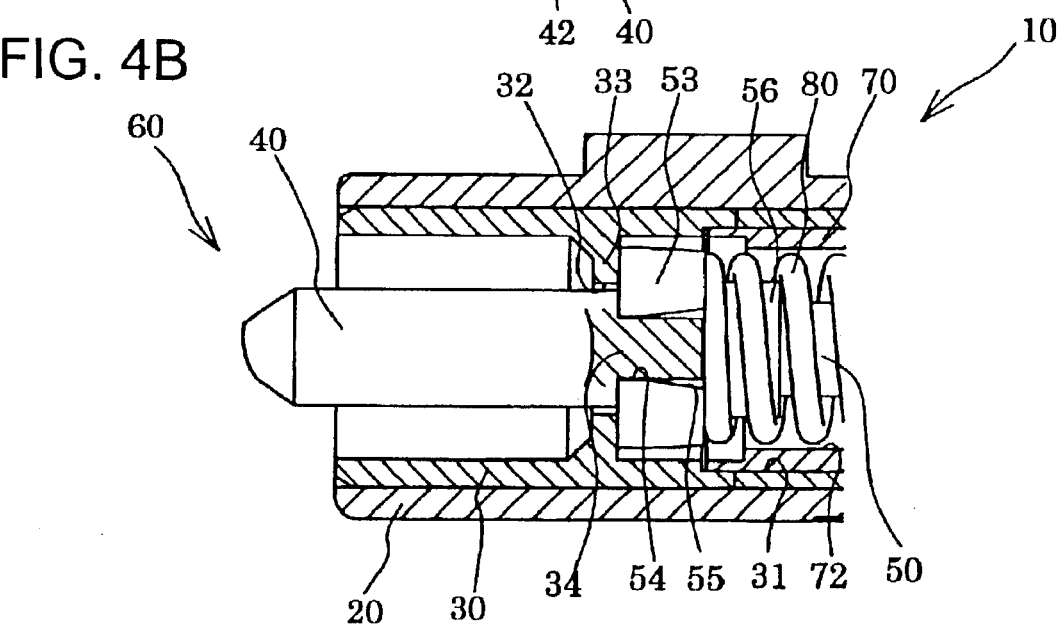
Figure 4C:
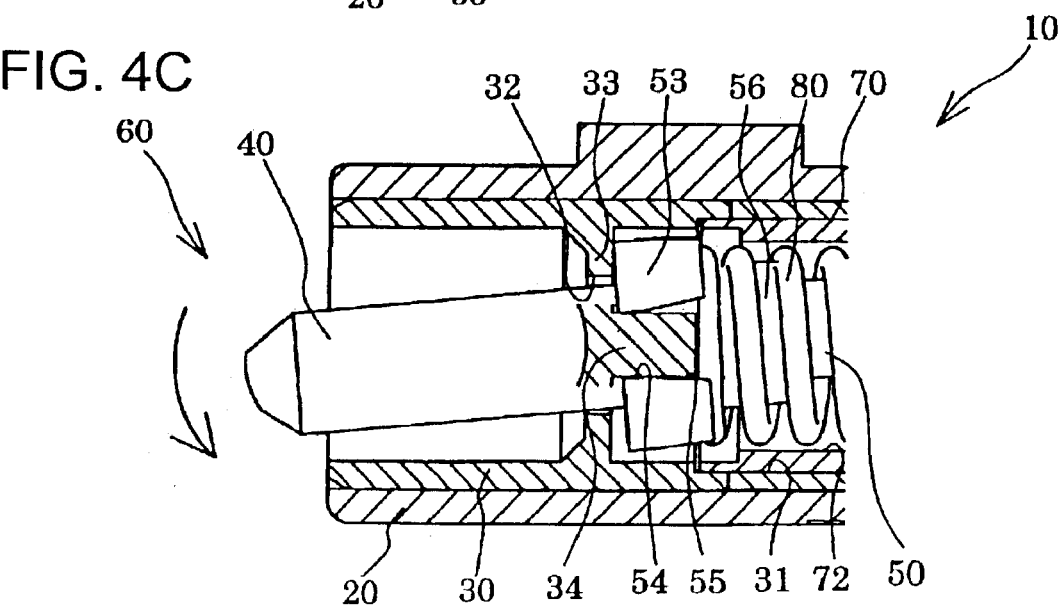

FIG. 1 is an exploded perspective view of an Angle-PC connector according to embodiment 1 of the invention, FIGS. 2A–2B are an exploded plan view and assembly sectional view of the Angle-PC connector, FIGS. 3A–3C are a perspective view, plan view and sectional view, respectively, of a ferrule, and FIGS. 4A–4C are sectional views of the Angle-PC connector.

As shown in the figures, the Angle-PC connector 10 of this embodiment has a holding member or plug housing 20 to fit to an SC-type optical connector adapter, a holding member or plug frame 30 to fit in the plug housing 20, a ferrule 60 holding the optical fiber for optical connection and to be inserted to the rear of the plug frame 30, a stop ring 70 having a tip to engage a rear end of the plug frame 30, and an urge spring 80 held between the ferrule 60 and the stop ring 70 and urging the ferrule 60 toward an axially forward direction.

As shown in FIGS. 3A–3C, the ferrule 60 is structured with a ferrule cylindrical body 40 formed with an outer diameter of 2.5 mm and a flange member 50 fit to one end of the ferrule cylindrical body 40.

The ferrule cylindrical body 40, generally in a circular cylindrical form, has therein an optical-fiber insertion hole 41 penetrating in the axial direction to insert and hold an optical fiber 1 therein. The optical-fiber insertion hole 41 has, at its rear end, a taper 42 having an inner diameter gradually increasing toward an opening thereof. By providing the taper 42, when inserting the optical fiber 1 in the optical-fiber insertion hole 41, the optical fiber 1 at its tip can be prevented from being broken or fractured by a contact with the end face of the ferrule cylindrical body 40.

For the ferrule cylindrical body 40, the applicable material includes a ceramic material such as zirconia, a plastic material, a glass material such as crystallized glass, borosilicate glass and quarts, and a metal material such as stainless steel, nickel or nickel alloys.

Meanwhile, the ferrule cylindrical body 40 has a tip formed in a surface slanted with respect to the plane orthogonal to the axis or in a convex surface form such as a convex spherical surface. In this embodiment, the tip of the ferrule cylindrical body 40 was formed in a convex spherical surface form having a deviated center of curvature with respect to the axis of the optical fiber 1.

When the Angle-Pc connectors 10 are oppositely connected through an optical connector adapter, the ferrule cylindrical bodies 40 are connected together within a split sleeve in such a positional relationship that the center of curvature of the convex spherical surface of each ferrule cylindrical body 40 and the connection point between the optical fibers 1 are positions on one line.

In order to realize a specification of a low insertion loss of 0.2 dB or less and a ultrahigh return loss of 60 dB or higher during such opposed connection, there is a need to provide the convex spherical surface with an eccentric center of curvature of 50 μm or less, preferably 30 μm–40 μm with respect to a reference plane having an predetermined angle of inclination (e.g. 8 degrees) relative to the plane orthogonal to the axis. This requires to provide the convex spherical surface with a center of curvature of 6 mm–9 mm.

The ferrule cylindrical body 40, when oppositely connected at the convex spherical surfaces, must be held in the plug frame 30 such that the ferrule cylindrical body 40 has a moving amount in rotating direction about the axis relative to the plug frame 30 of ±3 degree or less, preferably ±2 degree or less, in rotation angle.

On the other hand, the flange member 50 is structured with a fit hole 51 to fit there in one end of the ferrule cylindrical body 40, an optical-fiber-core insertion hole 52 to insert and hold therein an optical fiber core 2 coated on the periphery of the optical fiber 1, and a flange portion or part 53 radially projecting a predetermined amount to circumferentially extend at the side the fit hole 51 is opened.

The flange part 53 is formed with a predetermined clearance to an engaging projection 34 corresponding to an engaging portion or part of the plug frame 30, hereinafter detailed, thus having a rotation positioning portion or part 54 allowing a movement of the flange part 53 in a rotational direction about the axis of the optical fiber within a predetermined range by the predetermined clearance, and a rotation allowing portion or part 55 for forming, at the rear-end side of the rotation positioning part 54, a clearance greater than the clearance between the rotation positioning part 54 and the engaging projection 34.

In this embodiment, the flange part 53 is provided with axial key grooves in four locations at an interval of 90 degrees with respect to the circumferential direction. Thus, the rotation positioning part 54 and the rotation allowing part 55 are constituted by the key grooves. Specifically, the key grooves at their tips are given generally the equal axial width to thereby provide a rotation positioning part 54 forming a predetermined clearance to the engaging projection 34. By gradually increasing the width at the rear-end side toward the rear end, a rotation allowing part 55 is provided that forms a clearance greater than the clearance of between the rotation positioning part 54 and the engaging projection 34.

In this manner, the ferrule 60 is made such that, by providing a rotation positioning part 54 on the flange part 53, the movement of the ferrule 60 in rotational direction is allowed with in a predetermined clearance of rotation angle while, by a length of the rotation positioning part 54 in lengthwise direction, the ferrule 60 is allowed to incline a predetermined angle in a radial direction of the ferrule cylindrical body 40 with respect to the rotation positioning part 54 as a start point.

Meanwhile, at a rear-end side of the flange 50, there is provided a spring guide 56 having an outer diameter smaller than the outer diameter of the flange part 53. Over the outer periphery of the spring guide 56, the urge spring 80, such as a compression spring, is clamped by the stop ring 70 and the flange part 53.

Herein, the plug frame 30 into which the ferrule 60 is to be inserted and held by is formed, for example, of plastic, and has a ferrule-insertion hole 31 penetrating in the lengthwise direction and generally having a rectangular outer shape in section, as shown in FIGS. 1 and 2A–2B. The ferrule-insertion hole 31 has a flange part 33 formed with a projection hole 32 that has an inner diameter somewhat greater than an outer diameter of the ferrule cylindrical body 40 so that only the ferrule cylindrical body 40 is allowed to project.

Also, in the ferrule-insertion hole 31, an engaging part is provided adjacent the flange part 33 for engagement with the key grooves formed by the rotation positioning part 54 and rotation allowing part 55 of the flange part 53.

In this embodiment, because the rotation positioning part 54 and rotation allowing part 55 provided on the flange part 53 are formed by the key grooves, an engaging part is formed as two engaging projections 34 projecting toward the axis in opposite directions in the ferrule insertion hole 31.

The engaging projection 34 is provided in a predetermined engagement width entirely in the axial direction, i.e. in a predetermined thickness entirely in the axial direction, to form a predetermined clearance to the rotation positioning part 54. The rotation allowing part 55 forms a clearance greater than the rotation positioning part 54.

Due to this, as shown in FIGS. 4A–4C the ferrule 60 held in the ferrule-insertion hole 31 is allowed by the rotation positioning part 54, to rotationally move about the axis within a clearance of rotation angle and incline a predetermined amount in a widthwise direction A of the engaging projection 34 with respect to the engaging projection 34 as a start point.

Also, the engaging projection 34 is formed with a protrusion amount forming a predetermined clearance at between an end face 39 of the engaging projection 34 close to the flange part 53 and a bottom face 59 of the key groove formed by the rotation positioning part 54 and rotation allowing part 55. Consequently, by the clearance between the engaging projection 34 and the key groove, the ferrule 60 is allowed to incline in an opposite direction B to the engaging projection 34 with respect to the engaging projection 34 as a start point, in a radial direction of the ferrule cylindrical body 40.

Namely, the ferrule 60 is held to the plug frame 30 in a manner inclining a predetermined amount in two radial, orthogonal directions in a state allowed to move in rotational direction about the axis. Accordingly, when attaching/detaching the Angle-PC connector 10 to/from the optical connector adapter, the ferrule 60 inclines to thereby remove the stresses in the different direction from the axial direction, whereby the ferrule 60 or split sleeve in the optical connector adapter can be prevented against the occurrence of breakage, such as mars or deformations thereby enabling stable attaching/detaching.

Incidentally, for providing a ultrahigh return loss (60 dB or less) at a low insertion loss (0.2 dB or less) during opposed connection, the eccentric center of curvature of the ferrule 60 must be given 50 μm or smaller. For this, the rotation angle of the ferrule 60 in rotational direction about the axis with respect to the plug frame 30 must be suppressed to ±3 degree or less, preferably ±2 degree or less.

Consequently, by providing 0.01 mm–0.10 mm to the widthwise clearance between the engaging projection 34 and the rotation positioning part 54, the rotation angle of the ferrule 60 in rotational direction about the axis with respect to the plug frame 30 can be suppressed to ±2 degree or less.

Figure 5A:
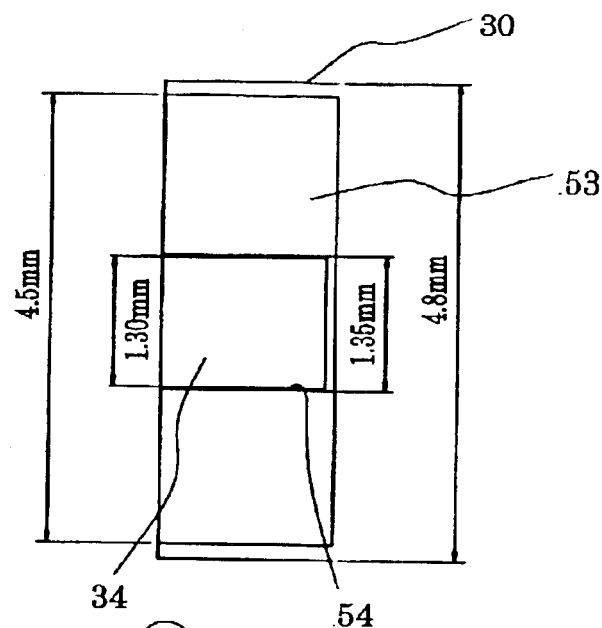
FIGS. 5A–5C are plan views showing an axial length of the rotation positioning part according to embodiment 1 of the invention.
Figure 5B:
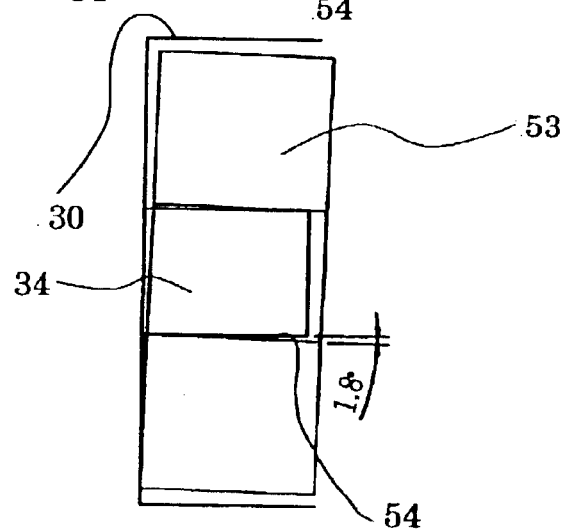

Herein, in the case that, as shown in FIG. 5A for example, the engaging projection 34 is given a width 1.30 mm and a key groove 54 (rotation positioning part 54 in the key groove) having a width 1.35 mm is axially provided in the conventional flange part 53 such that a rotation angle of the ferrule in rotation direction about the axis with respect to the plug frame is ±2 degrees or less, i.e. in the case that the clearance is 0.05 mm, the flange part 53 inclines 1.8 degrees in a widthwise direction with respect to the engaging projection 34 as a start point as shown in FIG. 5B. In this manner, with a slight inclination of 1.8 degrees, when the Angle-PC connector is attached/detached to/from the optical connector adapter, the unwanted stress in the direction different from the axial direction cannot be removed. Breakage such as mar or deformation is possibly caused in the optical connector adapter and Angle-PC connector.

Figure 5C:
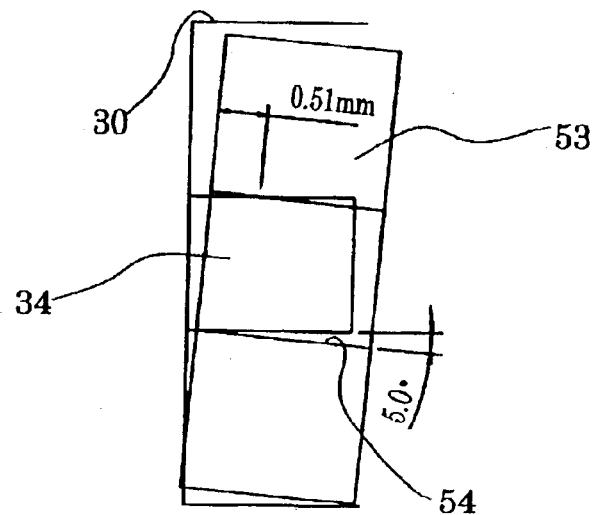

In this manner, when there occurred a stress in the direction different from the axial direction, in case the inclination angle for releasing the stress is given 5 degrees or more, the axial length of a rotation positioning part 54 to be provided in the flange part 53 is 0.51 mm as shown in FIG. 5C.

In this manner, the axial length of the rotation positioning part 54 is optimally 0.3 mm–0.5 mm depending upon working accuracy.

Meanwhile, the rotation allowing part 55 of the flange part 53 satisfactorily has a width increasing in a degree not abutted against the engaging projection 34 when inclined radially of the ferrule cylindrical body 40 with respect to the rotation positioning part 54 as a start point. For example, the inclination of the side surface of the rotation allowing part 55 forming the gradually increasing width may be approximately 5 degrees relative to the axial direction.

Meanwhile, the rotation allowing part 55 is not limited in shape, e.g. may be formed in a width greater than the width of the rotation positioning part 54 having a step to the rotation positioning part 54.

Meanwhile, as shown in FIGS. 1 and 2A–2B, the plug frame 30 is formed with two engaging holes 35 communicating with the ferrule-insertion hole 31 and opened in the outer periphery. The engaging hole 35 is adapted to engage the engaging part 75 provided at the tip of the hereinafter-referred stop ring 70.

Also, the stop ring 70 is of a metal, such as stainless steel or brass, plastic or the like, formed in a circular cylindrical form having a penetration hole 71 axially penetrated to be inserted by the spring guide 56 of the flange member 50.

The penetration hole 71 is structured with a large-diameter part 72 at the front side for insertion of the urge spring 80 and a small-diameter part 73 at the rear side for insertion of the spring guide 56 of the flange member 50. The urge spring 80 at its one end is allowed to contact with a step 74 provided by the internal-diameter difference between the large-diameter part 72 and the small-diameter part 73.

Incidentally, the urge spring 80 at its other end is in contact with the rear-end face of the flange part 53 so that the flange part 50 is urged axially frontward relative to the stop ring 70.

Also, the stop ring 70 on its front outer periphery is provided with an engaging part 75 for the stop ring to project into the engaging hole 35 when inserted in the ferrule-insertion hole 31 of the plug frame 30. The engaging part 75 is made in a taper form having a projection amount gradually decreasing as directed toward the tip. The engaging part 75 is made to be moved in the engaging hole 35 while spreading the rear end of the plug frame, into engagement with the engaging hole 35.

In order to hold the ferrule 60 in the plug frame 30 thus constructed, the ferrule 60 holding an optical fiber 1 is inserted in the ferrule-insertion hole 31 of the plug frame 30 such that the rotation positioning part 54 and rotation allowing part 55 structured by key grooves of the flange part 53 is put into engagement with the engaging projection 34. By sequentially inserting the urge spring 80 and stop ring 70 previously inserted over the optical fiber core 2, the engaging part 75 of the stop ring 70 is engaged by the engaging hole 35 of the plug frame 30. This fixes the stop ring 70 on the plug frame 30. At this time, the front side face of the flange part 53 of the ferrule 60 abuts against the flange part 33 of the plug frame 30. Due to this, the ferrule 60 is projected a predetermined amount at the projection hole 32 of the flange part 33 in a state restricted in movement toward the front, and held urged toward the axial forward.

Meanwhile, the ferrule 60 thus held is allowed to move in rotational direction about the axis with respect to the plug frame 30 within a predetermined range by the rotation positioning part 54, and the radial inclination amount is placed in an allowed state within a predetermined range by the lengthwise length of the rotation positioning part 54.

Furthermore, on the outer periphery of the plug frame 30 thus assembled, there are provided two of engaging convex parts 36 for engagement with the plug housing 20. By engaging these engaging convex parts 36 with the engaging concave parts 21 of the plug housing 20, the plug frame 30 is held movable within an axial predetermined range in the plug housing 20, thus configuring an Angle-PC connector.

The Angle-PC connector 10 thus formed, when oppositely connected by a not-shown optical connector adapter, is to be held in a state the ferrule 60 is moved toward the stop ring 70 such that mutual abutment is under a predetermined pressure.

In this manner, when the Angle-PC connector 10 is attached/detached to/from the optical connector adapter, the ferrule 60 is exerted by an axial pressure. However, the ferrule 60 held in the plug frame 30 can radially incline in a predetermined range in a state that its movement in rotational direction about the axis is allowed within a predetermined angle range with respect to the plug frame 30 by the rotation positioning part 54 and rotation allowing part 55. Consequently, the unwanted stress in a direction different from the axial direction can be removed. The optical connector adapter or Angle-PC connector 10 is prevented against the occurrence of breakage, such as mar or deformation, thereby improving attaching/detaching stability.

Incidentally, because the Angle-PC connector 10 can oppositely connect between the ferrules 60 in a state the movement in rotational direction of the ferrule 60 is allowed within a predetermined range, it is possible to easily realize an optical connection with a low insertion loss and high return loss.

Embodiment 2

Figure 6:
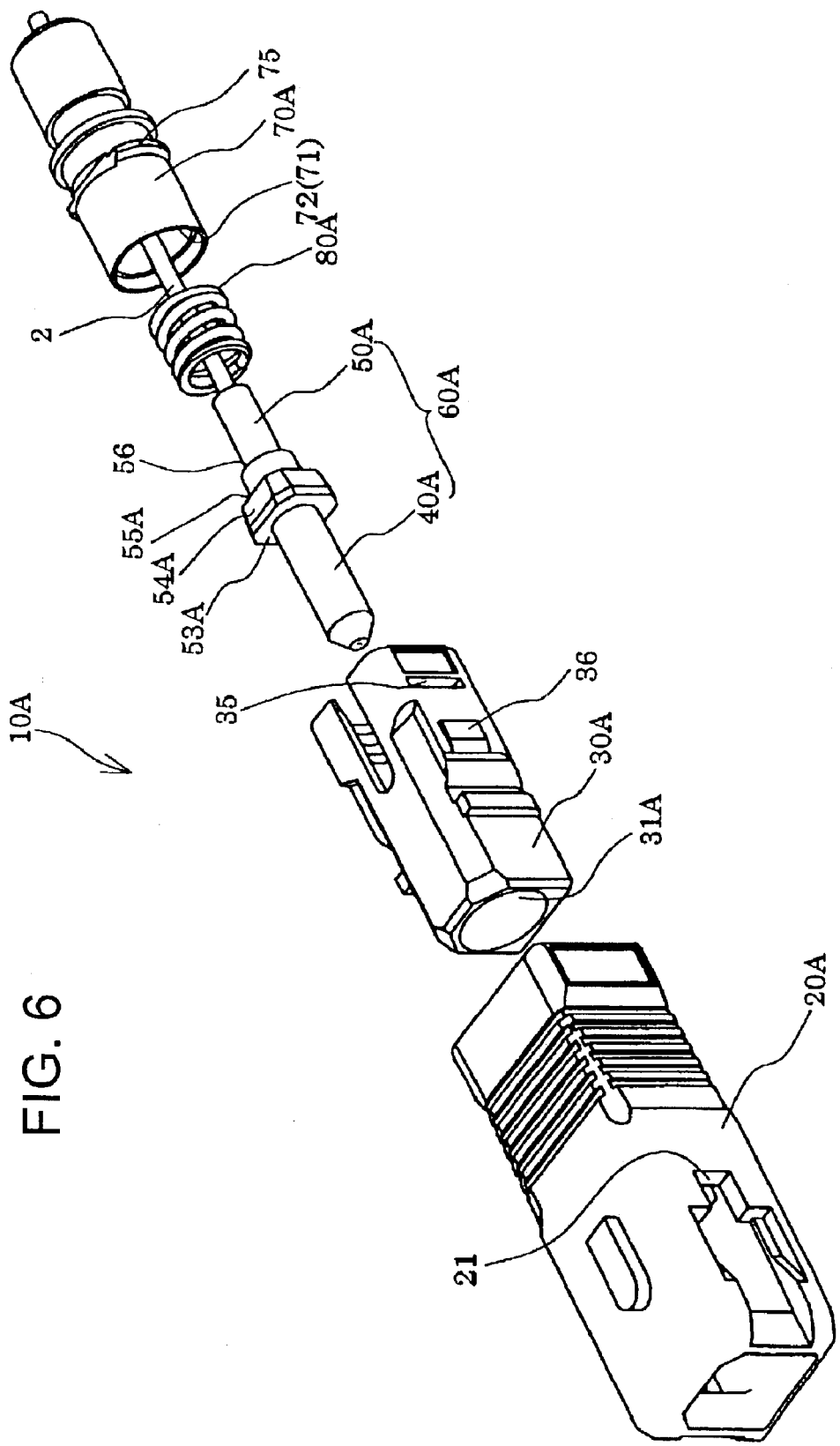
FIG. 6 is an exploded perspective view of an Angle-PC connector according to embodiment 2 of the invention.
Figure 7A:
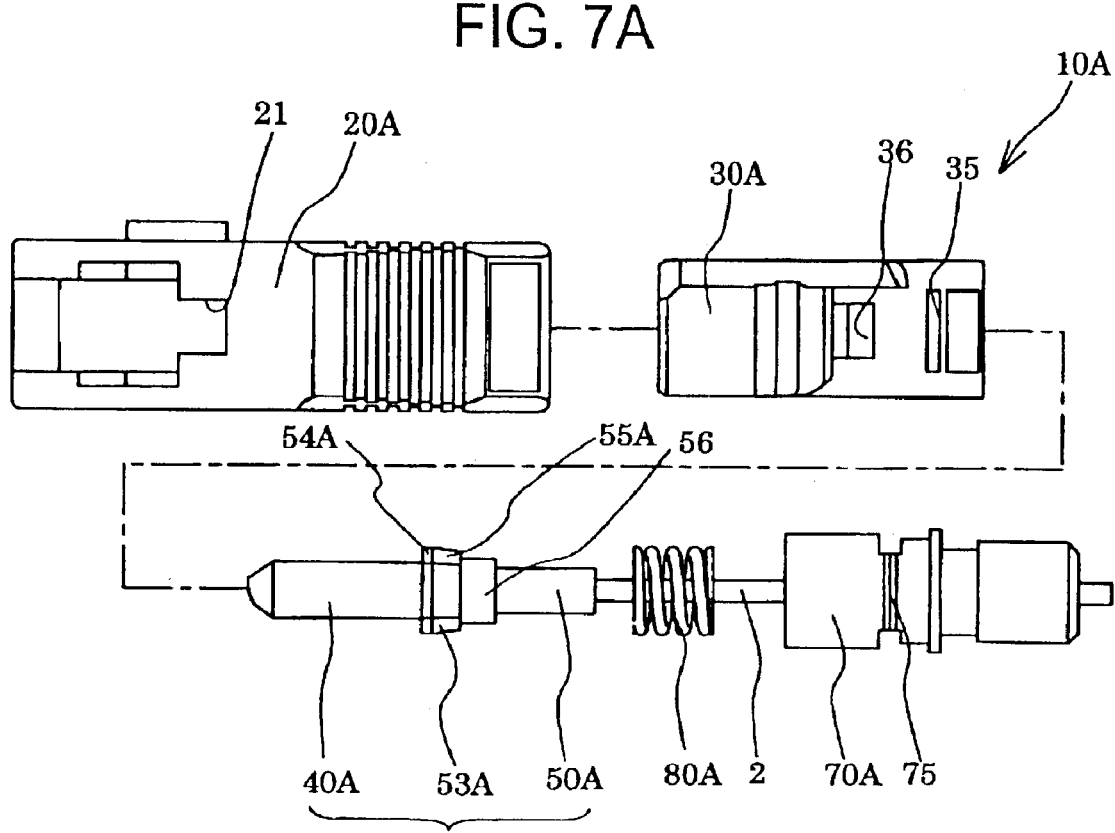
FIGS. 7A and 7B are an exploded plan view and assembly sectional view of the Angle-PC connector according to embodiment 2 of the invention.
Figure 7B:
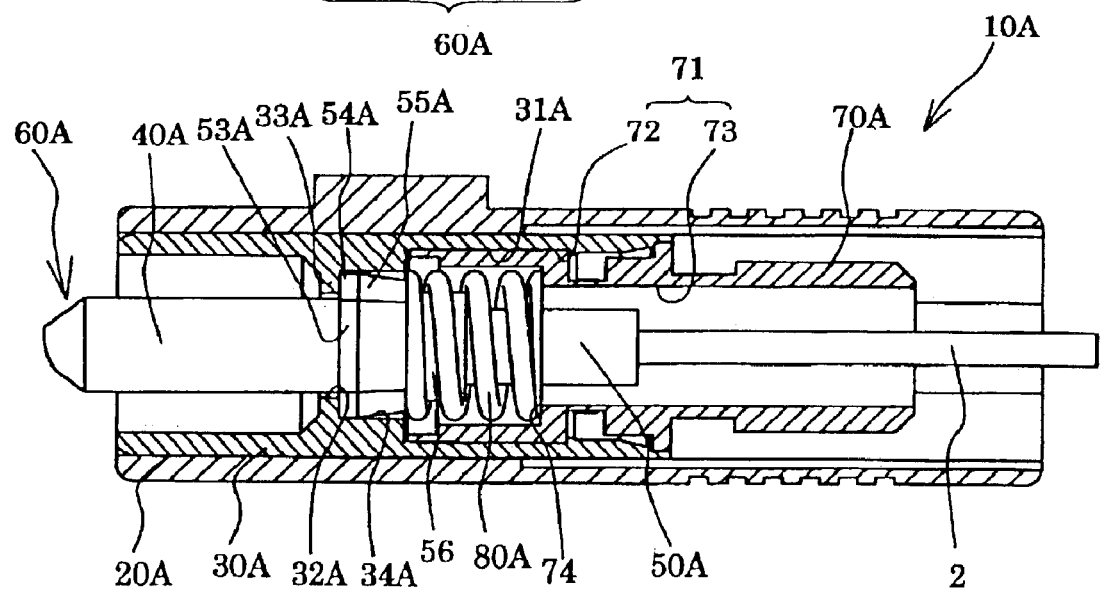
Figure 8A:
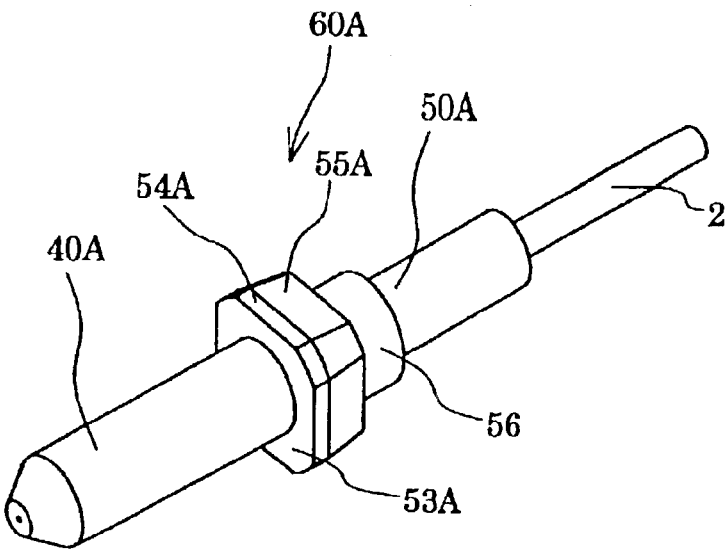
FIGS. 8A–8C are a perspective view, plan view and sectional view, respectively, of the ferrule according to embodiment 2 of the invention.
Figure 8B:
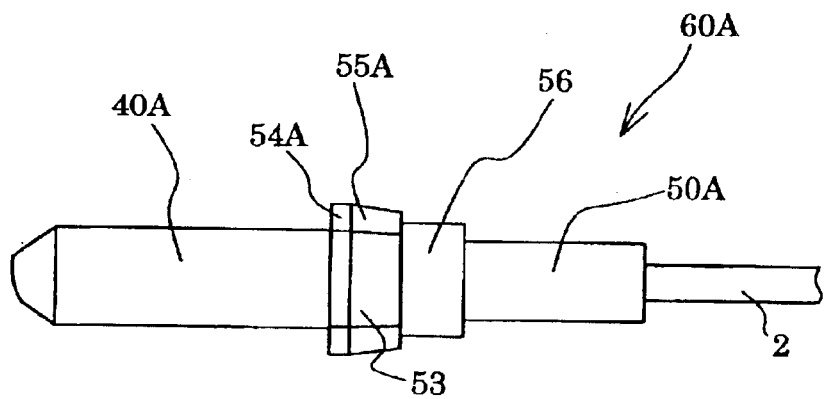
Figure 8C:
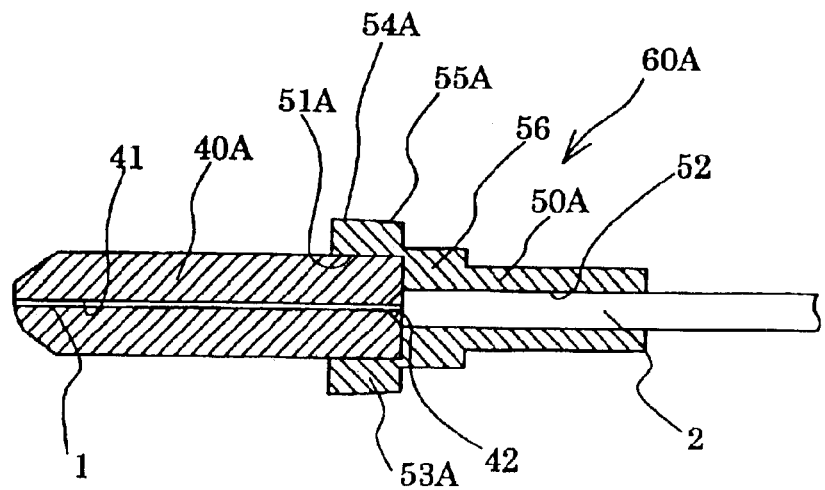
Figure 9A:
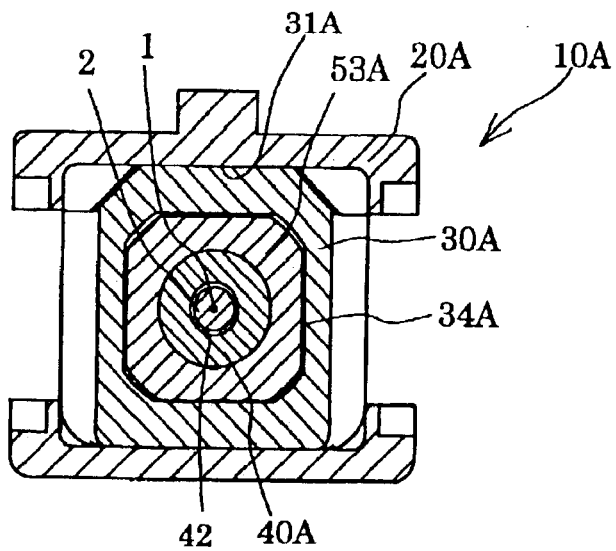
FIGS. 9A–9C are cross-sectional views of the Angle-Pc connector according to embodiment 2 of the invention.
Figure 9B:
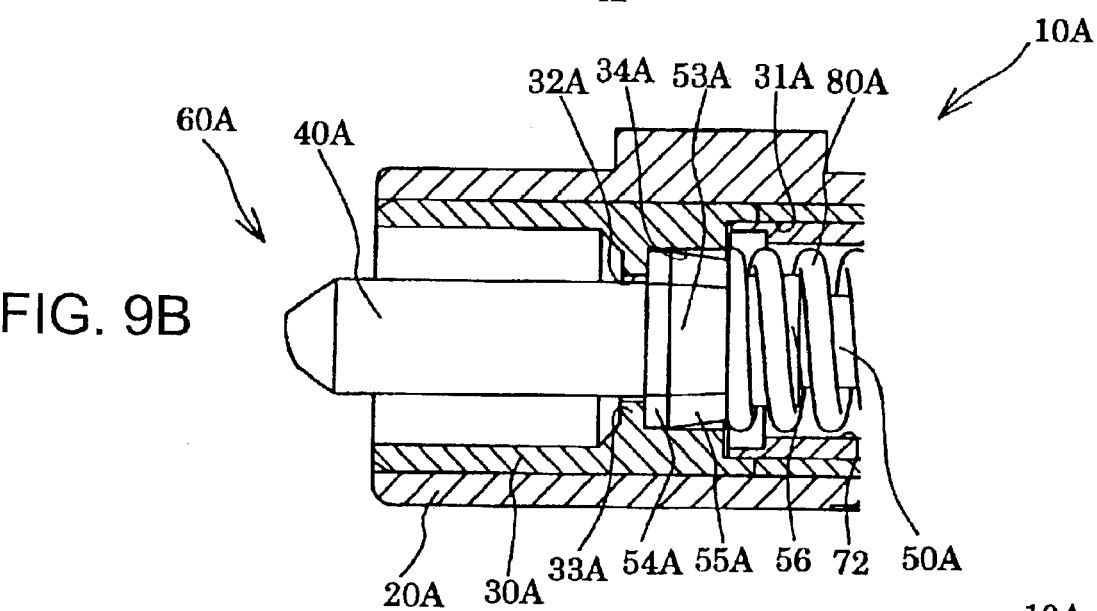
Figure 9C:
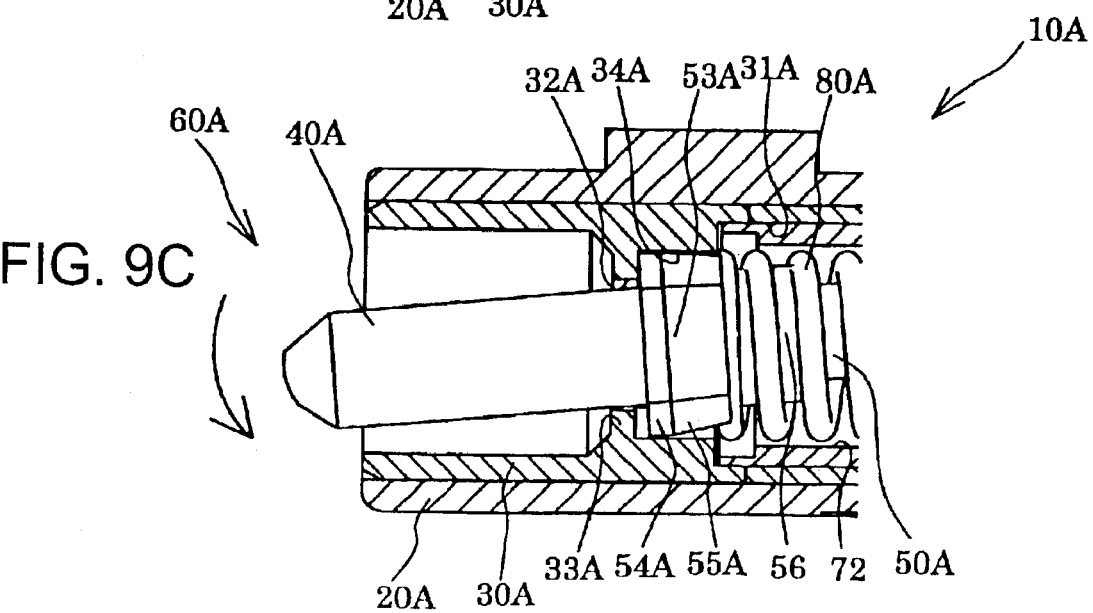

FIG. 6 is an exploded perspective view of an Angle-PC connector according to embodiment 2 of the invention, FIGS. 7A–7B are an exploded plan view and assembly sectional view of the Angle-Pc connector, FIGS. 8A–8C are a perspective view, plan view and sectional view respectively, of a ferrule, and FIGS. 9A–9C are sectional views of the Angle-Pc connector.

Although the foregoing embodiment 1 was on the SC-type Angle-PC connector that the ferrule cylindrical body 40 had the outer diameter of 2.5 mm, embodiment 2 is on an example of an Angle-PC connector that a ferrule cylindrical body 40A has an outer diameter of 1.25 mm. Incidentally, the corresponding parts to the foregoing embodiment 1 are attached with the same references to thereby omit the duplicated explanation.

As shown in the figure, the Angle-PC connector 10A of this embodiment has a plug housing 20A to fit to an optical connector adapter, a plug frame 30A to fit in the plug housing 20A, a ferrule 60A holding an optical fiber 1 for optical connection and to be inserted to the rear of the plug frame 30A, a stop ring 70A having a tip to engage a rear end of the plug frame 30A, and an urge spring 80A held between the ferrule 60A and the stop ring 70A and urging the ferrule 60A toward the axial forward.

As shown in FIGS. 8A–8C, the ferrule 60A is formed with an outer diameter of 1.25 mm, and structured with a ferrule cylindrical body 40A formed of a ceramic material such as zirconia, a glass material, a metal material such as stainless steel, nickel, nickel alloy or the like, and a flange member 50A fit to one end of the ferrule cylindrical body 40A.

The flange member 50A has a flange part 53A radially projecting to circumferentially extend on an outer periphery opened with a fit hole 51A to which the ferrule cylindrical body 40A at one end is to be fit.

The flange part 53A is formed generally rectangular in radial section, and has a rotation positioning part 54A configured by four axially-parallel surfaces at a side close to the ferrule cylindrical body 40A and a rotation allowing part 55A configured by four taper surfaces slanted toward the axis in a direction toward the stop ring 70A.

On the other hand, as shown in FIGS. 6 and 7A–7B, the plug frame 30A is provided with an engaging hole 34A for engagement with the rotation positioning part 54A and rotation allowing part 55A, adjacently to the flange part 33A having a projection hole 32A provided in the ferrule-insertion hole 31A.

In this embodiment, because the rotation positioning part 54A and rotation allowing part 55A is provided generally rectangular in radial section, the engaging part has a radial section generally in the same shape to the rotation positioning part 54A and a section somewhat greater than the rotation positioning part 54A made as a generally rectangular engaging hole 34A.

The engaging hole 34A is constantly provided with an engaging width in the axial direction, i.e. axially extending having vertical and horizontal opening width in a predetermined width. This forms a predetermined clearance at between the rotation positioning part 54A and the engaging hole 34A, and a clearance greater than the rotation positioning part 54A at between the rotation allowing part 55A and the engaging hole 34A.

Due to this, as shown in FIGS. 9A–9C, the ferrule 60A held in the ferrule-insertion hole 31A is allowed, by the rotation positioning part 54A, such that the movement in rotational direction about the axis is a predetermined clearance of rotation angle, and to incline a predetermined amount in opposite two directions of a plane forming the rotation positioning part 54A with respect to the engaging hole 34A as a start point.

Figure 10A:
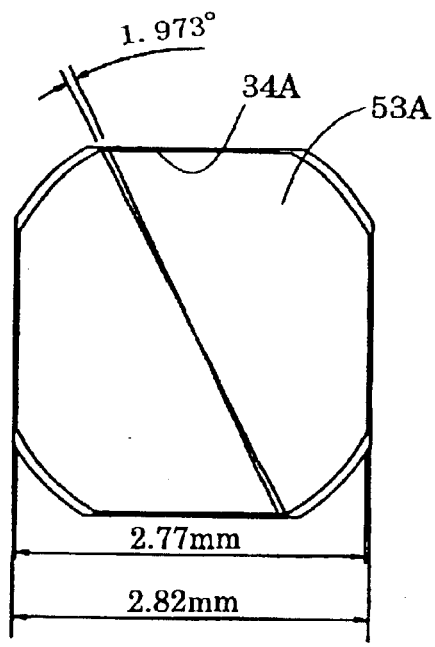
FIGS. 10A–10C are plan views showing an axial length of the rotation positioning part according to embodiment 2 of the invention.
Figure 10B:
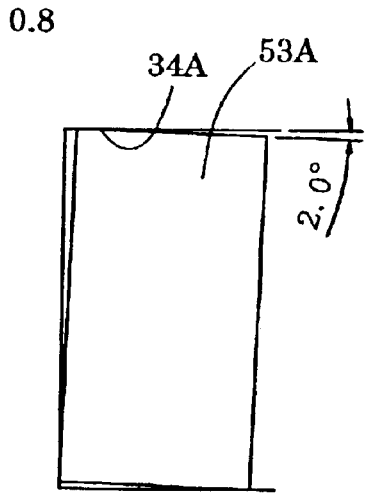

Herein, in the case that, as shown in FIG. 10A for example, the engaging hole 34A is given a width and height of 2.82 mm and a flange part 53A having a width and height of 2.77 mm is axially provided in the conventional flange member such that a rotation angle of the ferrule in rotation direction about the axis with respect to the plug frame is 2 degrees or less, or 1.973 degrees in this embodiment, i.e. in the case that the clearance is 0.05 mm, the ferrule inclines 2 degrees with respect to the flange part 53A as a start point as shown in FIG. 10B. With such a slight inclination of 2 degrees, when the Angle-PC connector is attached/detached to/from the optical connector adapter, the unwanted stress in the direction different from the axial direction cannot be removed. Breakage such as mar or deformation is possibly caused in the optical connector adapter and Angle-PC connector.

Figure 10C:
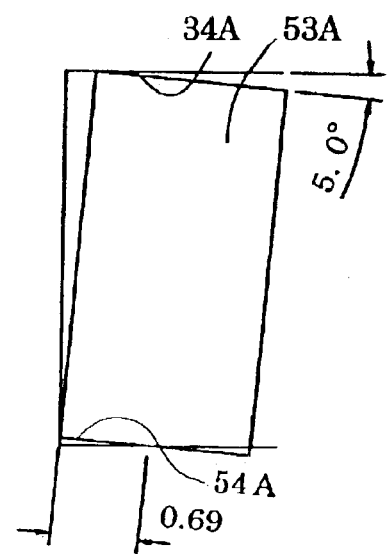

In this manner, when there is a stress occurring in the direction different from the axial direction, in case the inclination angle for releasing the stress is assumably given 5 degrees or more, the axial length of a rotation positioning part 54A to be provided in the flange part 53A is 0.69 mm or smaller as shown in FIG. 10C.

Such an axial length of the rotation positioning part 54A is optimally 0.4 mm–0.6 mm in consideration of working accuracy.

Meanwhile, the rotation allowing part 55A may be formed with a taper surface in such a degree as not abutted against the inner surface of the engaging hole 34A when the ferrule 60A is inclined radially relative to the plug frame 30A with respect to the rotation positioning part 54A as a start point. For example, the inclinations of the four taper surfaces configuring the rotation allowing part 55A may be respectively given approximately 5 degrees with respect to the axial direction.

In this manner, by providing a rotation positioning part 54A and rotation allowing part 55A on the Angle-PC connector 10A, the rotation of the ferrule 60A in rotational direction about the axis relative to the plug frame 30A is allowed to a predetermined rotation angle and a predetermined slant can be allowed in the radial direction. Accordingly, similarly to the foregoing embodiment 1, when attaching/detaching to/from the optical connector adapter, the unwanted stress in a direction different from the axial direction can be removed to prevent the optical connector adapter or Angle-PC connector 10A against the occurrence of breakage, such as mar or deformation, thereby enabling optical connection with low insertion loss and high return loss.

Incidentally, because the engagement of plug frame 30A and stop ring 70A, the engagement of plug frame 30A and plug housing 20A and the like are similar to embodiment 1, the same parts such as engaging holes, engaging projections and the like to be used in engagement are attached by the corresponding references, to omit duplicated explanations.

Meanwhile, in this embodiment, although the flange part 53A was made generally rectangular in radial section, this is not limited to, e.g. the flange may be made hexagonal in radial section. Such examples are explained in the below.

Figure 11:
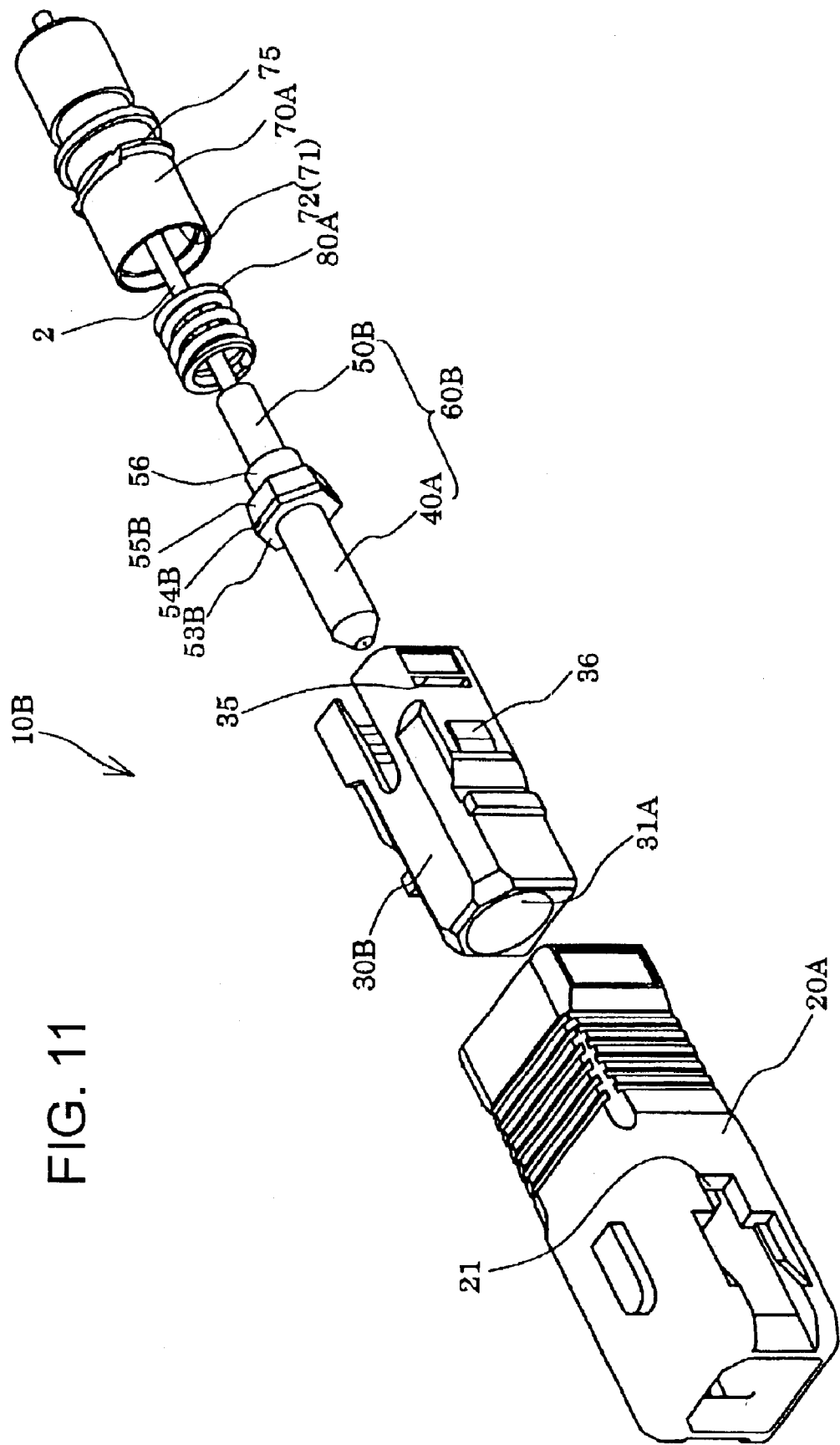
FIG. 11 is an exploded perspective view of the Angle-PC connector showing another example of flange part according to embodiment 2 of the invention.
Figure 12A:
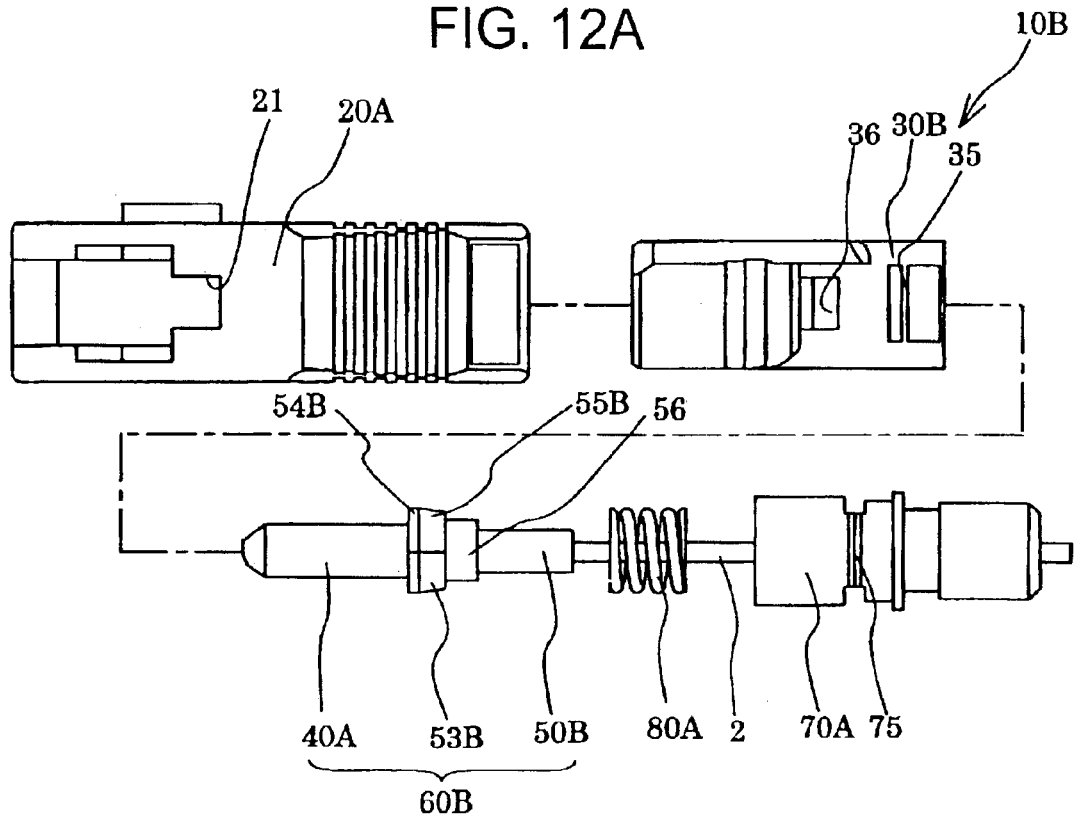
FIGS. 12A–12B are an exploded perspective view and a cross-sectional view, respectively, of the Angle-Pc connector showing another example of flange part according to embodiment 2 of the invention.
Figure 12B:
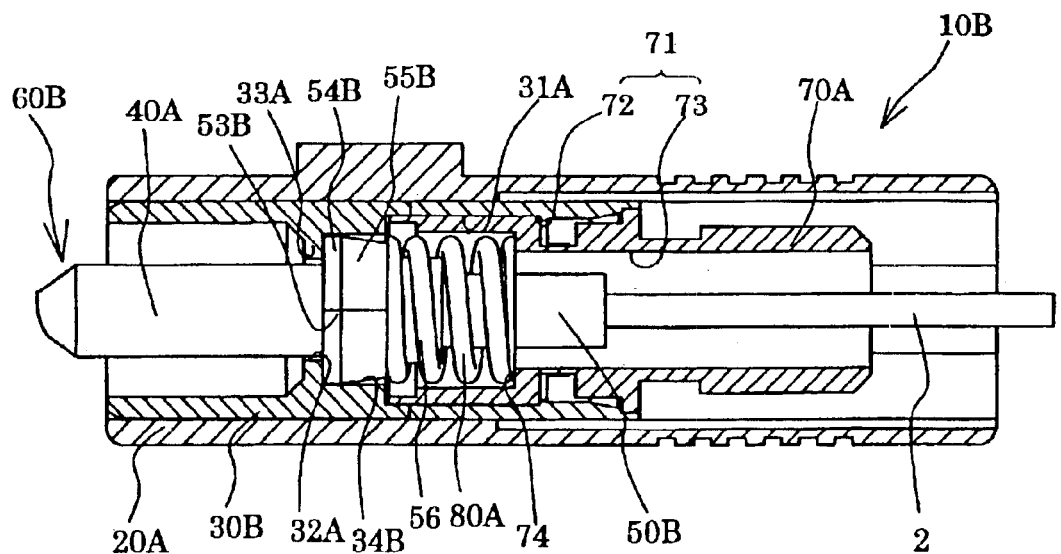
Figure 13A:
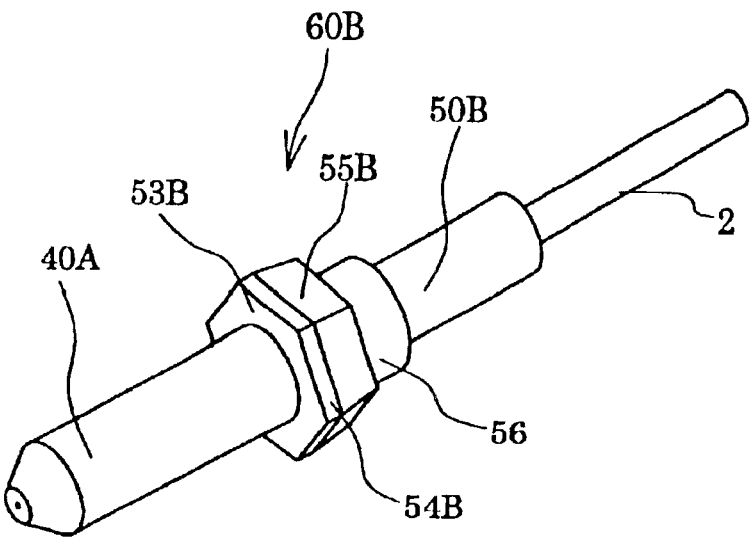
FIGS. 13A–13C are a perspective view, plan view and sectional view, respectively, showing another example of flange part according to embodiment 2 of the invention.
Figure 13B:
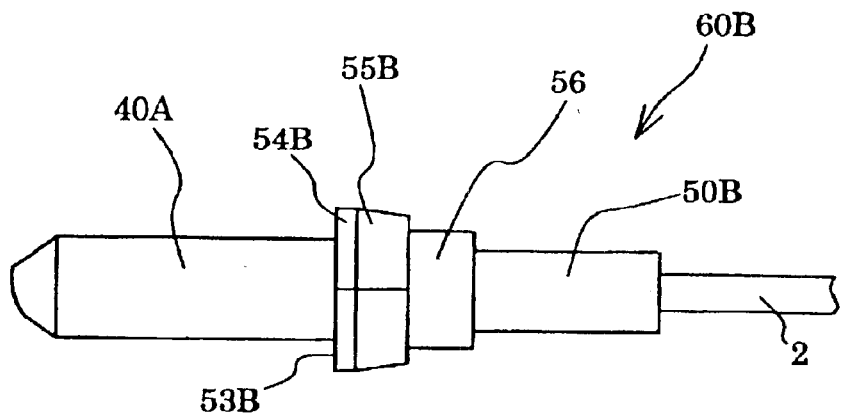
Figure 13C:
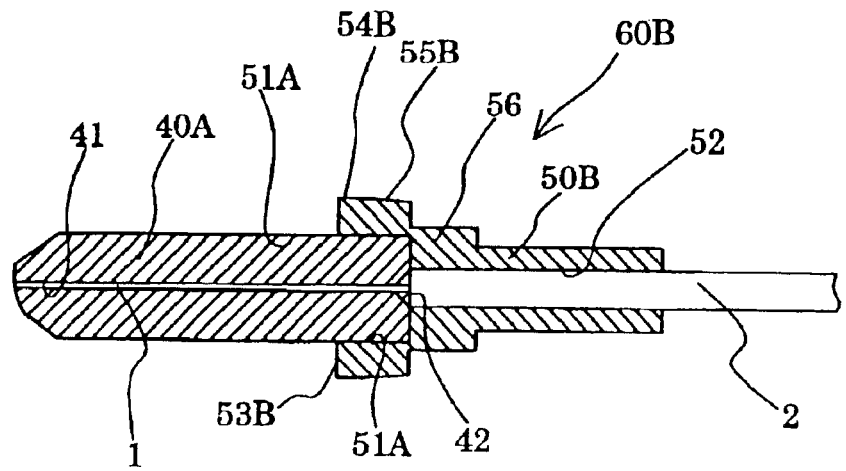
Figure 14A:
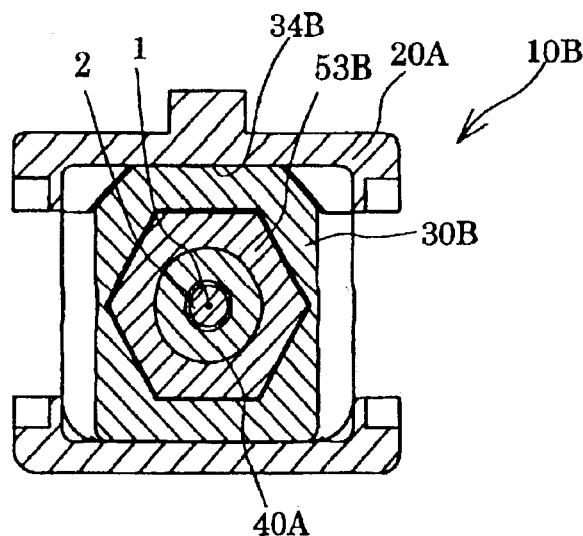
FIGS. 14A–14C are cross-sectional views of the Angle-Pc connector showing another example of flange part according to embodiment 2 of the invention.
Figure 14B:
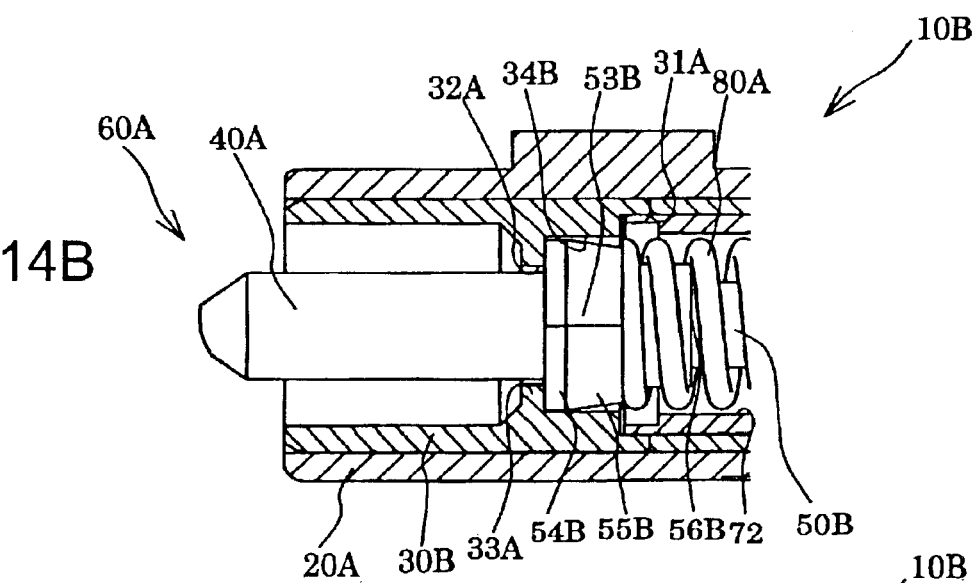
Figure 14C:
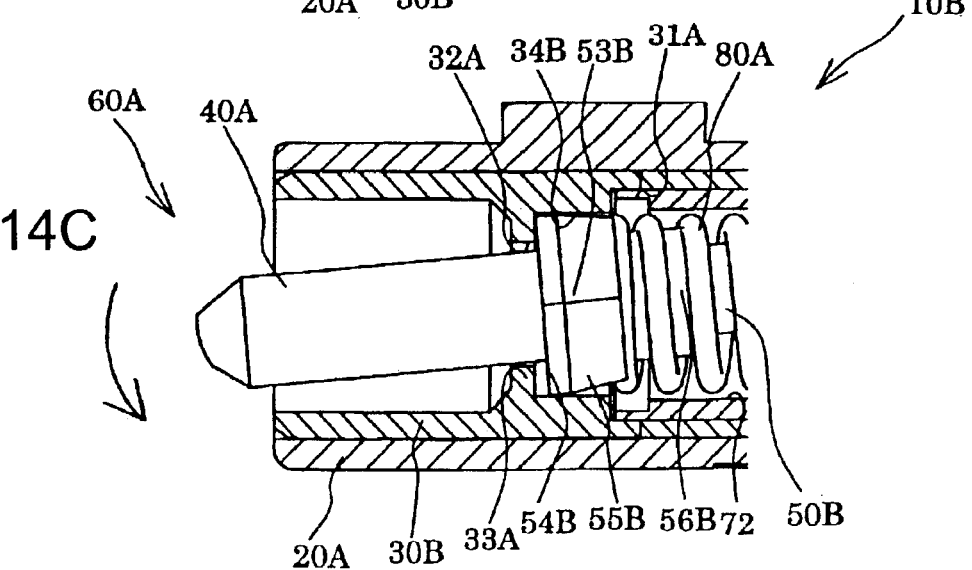

FIG. 11 is an exploded perspective view of an Angle-Pc connector showing another flange example, FIGS. 12A–12B are an exploded perspective view and assembly sectional view of the Angle-PC connector showing the other flange example, FIGS. 13A–13C are a perspective view, plan view and sectional view of a ferrule respectively, showing the other flange example, and FIGS. 14A–14C are sectional views showing the other flange example.

As shown in the figure, the Angle-PC connector 10B has a plug housing 20A, a plug frame 30B to fit in the plug housing, a ferrule 60B holding an optical fiber for optical connection and to be inserted to the rear of the plug frame 30B, a stop ring 70A having a tip to engage a rear end of the plug frame 30B, and an urge spring 80A held between the ferrule 60B and the plug frame 30B and urging the ferrule 60B toward the axial forward.

The flange member 50B, to be fit to the rear end of the ferrule cylindrical body 40A of the ferrule 60B, has a flange part 53B projecting to circumferentially extend on an outer periphery of the fit part 51A close to the opening and formed hexagonal in radial section.

The flange part 53B is formed hexagonal in radial section, and has a rotation positioning part 54B configured by six surfaces parallel with the axial direction at a side close to the ferrule cylindrical body 40A and a rotation allowing part 55B configured by six taper surfaces slanted in the axial direction toward a side close to the stop ring 70A.

On the other hand, as shown in FIGS. 11 and 12A–12B, the plug frame 30B is provided with an engaging part 34B for engagement with the rotation positioning part 54B and rotation allowing part 55B, adjacently to the flange part 33A provided in the ferrule-insertion hole 31A.

In this embodiment, because the rotation positioning part 54B and rotation allowing part 55B is formed hexagonal in radial section, the engaging part has a radial section generally in the same shape to the rotation positioning part 54B and a section somewhat greater than the rotation positioning part 54B made as a generally hexagonal engaging hole 34B.

The engaging hole 34B is provided equal in engaging width in the axial direction, i.e. constant in the distance between the opposed inner surfaces in the axial direction. This forms a predetermined clearance at between the rotation positioning part 54B and the engaging hole 34B, and a clearance greater than the rotation positioning part 54B at between the rotation allowing part 55B and the engaging hole 34B.

Even in case the flange part 53B and the engaging hole 34B are made hexagonal in radial section, the ferrule 60A held in the ferrule-insertion hole 31A as shown in FIGS. 14A–14C is allowed, by the rotation positioning part 54B, such that the movement in rotational direction about the axis is a predetermined clearance of rotation angle with respect to the plug frame 30B, and to incline a predetermined amount in opposite three directions of a plane forming the rotation positioning part 34A with respect to the engaging hole 34B as a start point. The similar effect to the above embodiment is obtainable.

Meanwhile, such a ferrule 60B having a flange part 53B hexagonal in radial section is used, in many cases, in an LC-type Angle-PC connectors.

Of course, in also the FC-type, MU-type or LC-type Angle-PC connector, the similar effect to the above embodiment can be obtained by providing a rotation positioning part 54B and rotation allowing part 55B on the flange part 53B as described above.

Figure 15A:
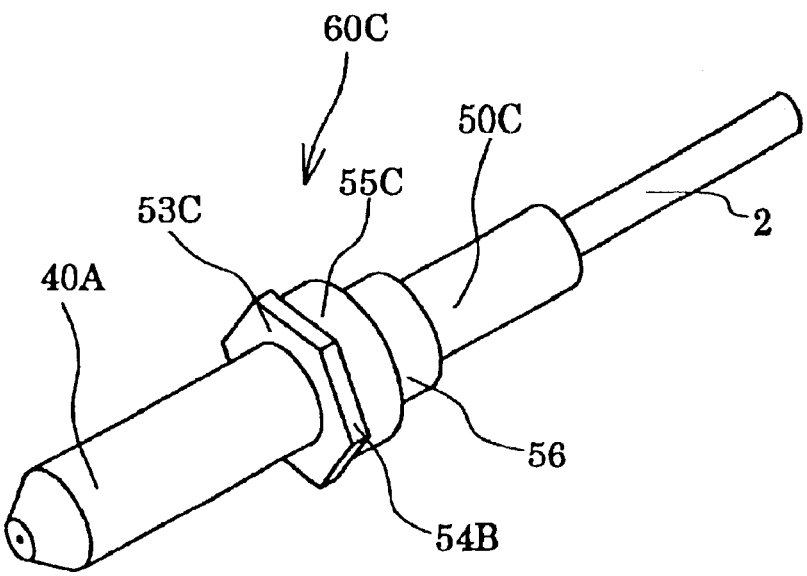
Figure 15B:
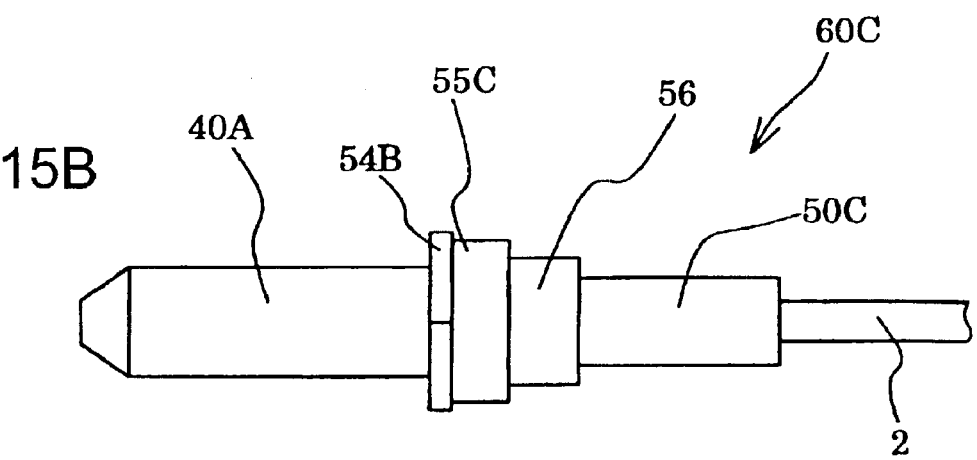
Figure 15C:
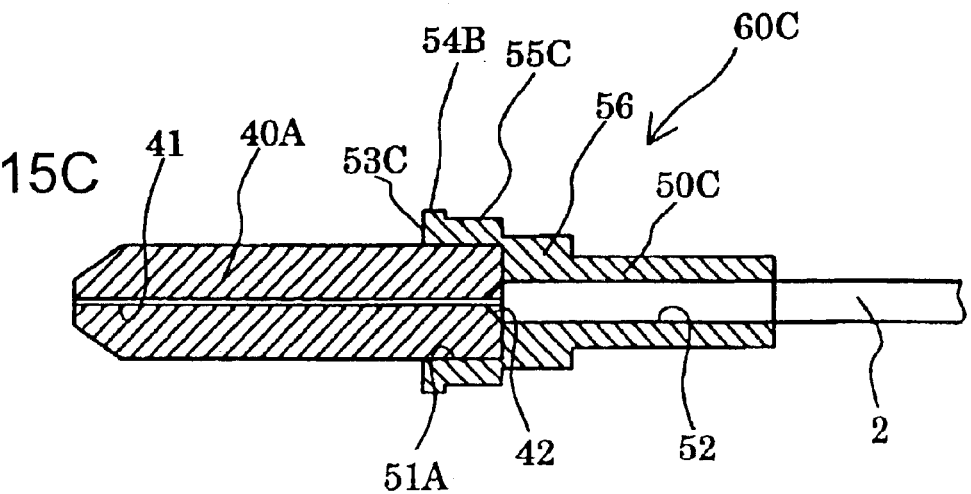
Figure 16A:
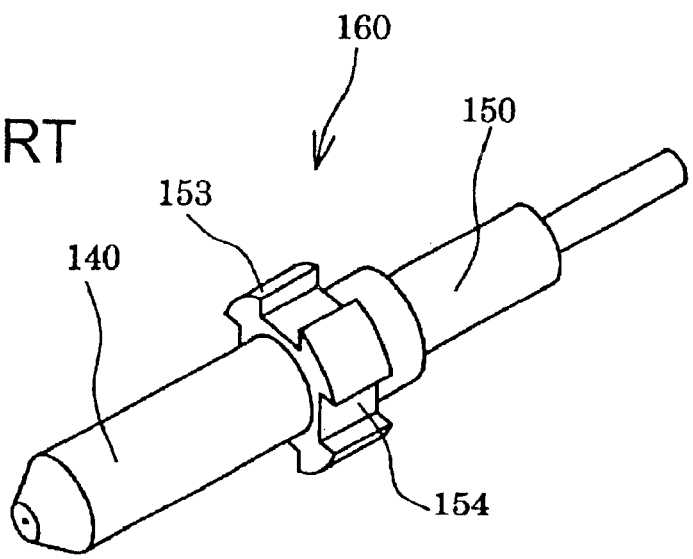
FIGS. 16A–16C are perspective and plan views of a ferrule according to a related art.
Figure 16B:
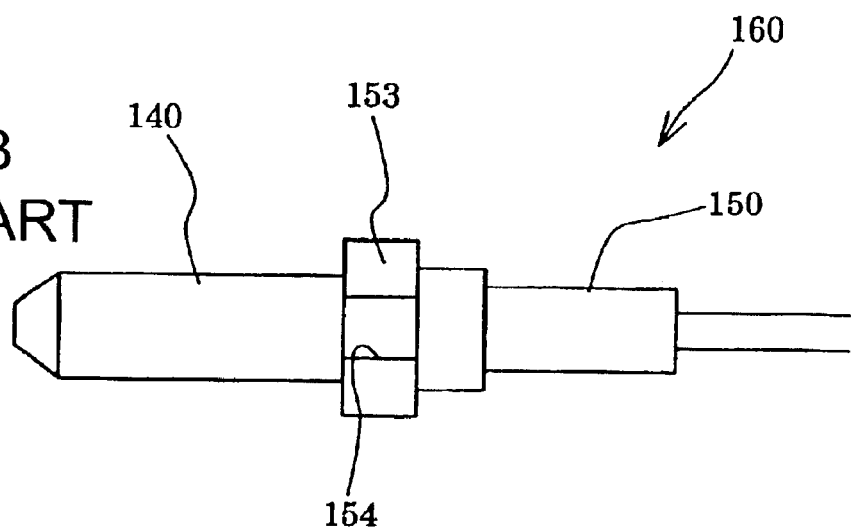
Figure 16C:
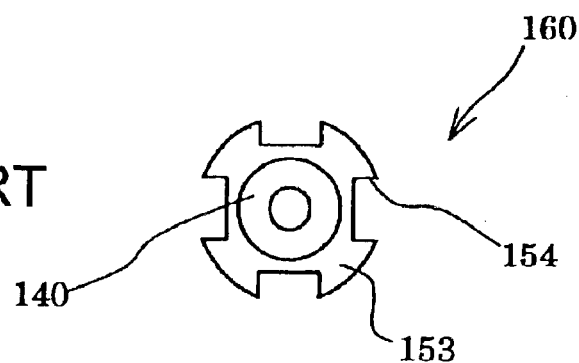

Incidentally, the shape of the rotation allowing part of the flange part is not especially limited unless abutting against an engaging projection at a predetermined angle or less and restricting the inclination when inclined to an inclination angle defined by the rotation positioning part, e.g. may be circular cylindrical as shown in FIGS. 15A–15C.

In this manner, by configuring the ferrule 60C with a ferrule cylindrical body 40A and a flange member 50C to be fit to the rear end of the ferrule cylindrical body 40A and having a sectionally hexagonal rotation positioning part 54B and circular cylindrical rotation allowing part 55C, it is possible to easily work a fine flange part 53C.

Meanwhile, in the case of making a flange having only a rotation positioning part without providing a rotation allowing part, there is a fear of weak strength and hence breakage upon urged by an urge spring. Because the urge spring abuts against the rear-end face of the rotation allowing part formed in a cylindrical form or by a taper surface in the outer periphery, it is possible to prevent the flange from being broken by an urge force of the urge spring.

Other Embodiments

Although embodiments 1 and 2 of the invention were explained above, the basic structure of Angle-PC connector is not limited to those described above.

For example, although the foregoing embodiment 1 had the rotation positioning part and rotation allowing part made by key grooves and the engaging part by engaging projections, this is not limited to, e.g. even in the case of an SC-type Angle-PC connector, it may be made with a flange generally rectangular or hexagonal in radial section and an engaging part by an engaging hole generally in the same form as the rotation positioning part, similarly to the embodiment 2.

Also, the embodiments 1 and 2 were by the rotation positioning part 54, 54A and 54B having a predetermined axial length, these are not limited to, e.g. the rotation allowing part 55, 55A and 55B may be provided axially of a flange part 53, 53A, 53B and 53C. Namely, abutting a front corner of the rotation allowing part against an engaging part provides a rotation positioning part to restrict the movement in rotational direction to a predetermined range. Abutting a slant surface of the rotation allowing part against the engaging part restricts the movement in an inclination direction to a predetermined amount. Consequently, in the case of providing a rotation allowing part in the axial direction, the inclination angle to the axis of the rotation allowing part can be rendered as an inclination angle of the ferrule itself.

Furthermore, although the embodiments 1 and 2 exemplified the SC-type Angle-PC connector 10, 10A, 10B, these are not limited to. It is naturally possible to use the present invention for an FC-type and MU-type, LC-type or the like.

As explained above, according to the Angle-PC connector of the present invention, by providing a rotation positioning part and rotation allowing part in the flange part, the holding member of the ferrule can be allowed in its rotation angle of rotational direction within a predetermined range and can be inclined within a predetermined range toward the radial direction. A low insertion loss and high return loss can be easily realized during optical connection, and the stress in a different direction from the axial direction can be removed when attached/detached to/from an optical connector adapter. Breakage, such as mar or deformation, is prevented during attaching/detaching thereby enabling stable attaching/detaching.

What is claimed is:

1. An optical connector comprising:
   a ferrule comprised of a cylindrical body for supporting an optical fiber, and a flange member having an end portion connected to a first end of the cylindrical body, the cylindrical body having a second end formed into a convex surface inclined relative to a plane orthogonal to an axis of the optical fiber, and the flange member having a flange part projecting circumferentially from the end portion thereof;
   a holding member supporting the ferrule in an assembled state of the optical connector to define an axis of the optical connector which is collinear with the optical fiber axis in the assembled state of the optical connector, the holding member having an engaging part;
   a rotation positioning part formed in the flange part of the flange member for positioning the flange part relative to the holding member to provide a first clearance between the rotation positioning part and the engaging part of the holding member for restricting rotation of the ferrule about the fiber optical axis relative to the holding member; and
   a rotation allowing part formed in the flange part of the flange member and spaced from the engaging part of the holding member to provide a second clearance therebetween greater than the first clearance for allowing rotational movement of the ferrule so as to permit the ferrule to incline in a direction transverse to the axis of the optical connector.

2. An optical connector according to claim 1; wherein the first clearance between the rotation positioning part and the engaging part of the holding member permits the ferrule to rotate about the optical fiber axis with respect to the holding member within a rotation angle of ±3 degrees or less.

3. An optical connector according to claim 2; wherein the rotation positioning part is disposed at an inclination angle of ±5 degrees or greater with respect to the optical fiber axis.

4. An optical connector according to claim 2; wherein the flange part of the flange member has a plurality of key grooves forming the rotation positioning part and the rotation allowing part; and wherein the engaging part comprises a plurality of projections projecting into the respective key grooves of the flange part.

5. An optical connector according to claim 1; wherein the first clearance between the rotation positioning part and the engaging part of the holding member permits the ferrule to rotate about the optical fiber axis with respect to the holding member within a rotation angle of ±2 degrees or less.

6. An optical connector according to claim 5; wherein the rotation positioning part is disposed at an inclination angle of ±5 degrees or greater with respect to the optical fiber axis.

7. An optical connector according to claim 5; wherein the flange part of the flange member has a plurality of key grooves forming the rotation positioning part and the rotation allowing part; and wherein the engaging part comprises a plurality of projections projecting into the respective key grooves of the flange part.

8. An optical connector according to claim 1; wherein the rotation positioning part is disposed at an inclination angle of ±5 degrees or greater with respect to the optical fiber axis.

9. An optical connector according to claim 8; wherein the flange part of the flange member has a plurality of key grooves forming the rotation positioning part and the rotation allowing part; and wherein the engaging part comprises a plurality of projections projecting into the respective key grooves of the flange part.

10. An optical connector according to claim 1; wherein the flange part of the flange member has a plurality of key grooves forming the rotation positioning part and the rotation allowing part; and wherein the engaging part comprises a plurality of projections projecting into the respective key grooves of the flange part.

11. An optical connector according to claim 10; wherein the cylindrical body of the ferrule has an outer diameter of substantially 2.5 mm.

12. An optical connector according to claim 10; wherein each of the key grooves has an axial length of 0.3 mm–0.5 mm.

13. An optical connector according to claim 10; wherein the holding member is configured for connection to an SC-type connector adapter.

14. An optical connector according to claim 1; wherein the rotation positioning part and the rotation allowing part are formed in an outer peripheral surface of the flange part of the flange member; and wherein the engaging part of the holding member comprises an engaging hole for engagement with the rotation positioning part and the rotation allowing part.

15. An optical connector according to claim 14; wherein the rotation allowing part comprises a taper surface of the flange part inclined toward the optical fiber axis.

16. An optical connector according to claim 15; wherein the taper surface of the flange part is inclined at an angle of 5 degrees with respect to the optical fiber axis.

17. An optical connector according to claim 15; wherein the outer peripheral surface of the flange part is generally disk-shaped.

18. An optical connector according to claim 14; wherein the cylindrical body of the ferrule has an outer diameter of substantially 1.25 mm.

19. An optical connector according to claim 18; wherein the rotation positioning part has an outer peripheral surface having an axial length of 0.4–0.6 mm.

20. An optical connector according to claim 14; wherein the holding member is configured for connection to an MU-type or LC-type connector adapter.

21. An optical connector according to claim 1; wherein the flange part of the flange member is generally disk-shaped.

22. An optical connector according to claim 1; wherein the flange part of the flange member is in the form of a polygon.

23. An optical connector comprising:
   a ferrule having a body for supporting an optical fiber and having a first end formed into a convex surface inclined relative to a plane orthogonal to an axis of the optical fiber, and a flange member having an end portion connected to a second end of the body and a flange part projecting circumferentially from the end portion, the flange part having a plurality of grooves each having a first surface extending along a plane disposed at a first angle relative to the optical fiber axis and a second surface extending along a plane disposed at a second angle relative to the optical fiber axis different from the first angle; and
   a holding member supporting the ferrule in an assembled state of the optical connector to define an axis of the optical connector which is collinear with the optical fiber axis in the assembled state of the optical connector, the holding member having a plurality of projecting portions corresponding to respective ones of the grooves of the flange part so that the first surface of each of the grooves is spaced from the corresponding projecting portion to provide a first clearance therebetween for restricting rotation of the ferrule about the fiber optical axis relative to the holding member and so that the second surface of each of the grooves is spaced from the corresponding projecting portion to provide a second clearance therebetween greater than the first clearance for allowing rotational movement of the ferrule so as to permit the ferrule to incline in a direction transverse to the axis of the optical connector.

24. An optical connector according to claim 23; wherein the first clearance between the first surface and the corresponding projecting portion permits the ferrule to rotate about the optical fiber axis with respect to the holding member within a rotation angle of ±3 degrees or less.

25. An optical connector according to claim 23; wherein the first clearance between the first surface and the corresponding projecting portion permits the ferrule to rotate about the optical fiber axis with respect to the holding member within a rotation angle of ±2 degrees or less.

26. An optical connector according to claim 23; wherein the first surface of each of the grooves of the flange part is disposed at an inclination angle of ±5 degrees or greater with respect to the optical fiber axis.

27. An optical connector according to claim 23; wherein the body of the ferrule comprises a cylindrical body having an outer diameter of substantially 2.5 mm.

28. An optical connector according to claim 23; wherein the body of the ferrule comprises a cylindrical body having an outer diameter of substantially 1.25 mm.

29. An optical connector according to claim 23; wherein each of the grooves of the flange part has an axial length of 0.3 mm–0.5 mm.

30. An optical connector according to claim 23; herein the second surface of the flange part is inclined toward the optical fiber axis at an angle of about 5 degrees relative to the optical fiber axis.

* * * * *